US012812045B2

(12) United States Patent
Tashiro

(10) Patent No.: US 12,812,045 B2
(45) Date of Patent: Nov. 24, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hideyasu Tashiro, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 201 days.

(21) Appl. No.: 18/786,713

(22) Filed: Jul. 29, 2024

(65) Prior Publication Data

US 2025/0055945 A1 Feb. 13, 2025

(30) Foreign Application Priority Data

Aug. 8, 2023 (JP) ................................ 2023-129323

(51) Int. Cl.
*H04N 1/00* (2006.01)
*G06T 7/00* (2017.01)
*G06V 10/24* (2022.01)

(52) U.S. Cl.
CPC ....... *H04N 1/00029* (2013.01); *G06T 7/0008* (2013.01); *G06V 10/245* (2022.01); *H04N 1/00005* (2013.01); *G06T 2207/30144* (2013.01); *G06V 2201/07* (2022.01)

(58) Field of Classification Search
CPC ........... H04N 1/00029; H04N 1/00005; G06V 10/245; G06V 2201/07; G06T 7/0008; G06T 2207/30144
See application file for complete search history.

(56) References Cited

U.S. PATENT DOCUMENTS

| | | | | |
|---|---|---|---|---|
| 11,461,602 | B2 | 10/2022 | Tashiro | |
| 12,039,206 | B2 | 7/2024 | Tashiro | |
| 2015/0116734 | A1* | 4/2015 | Howard | G06T 7/001 358/1.4 |
| 2019/0050975 | A1* | 2/2019 | Nakamura | G06T 7/001 |
| 2021/0041373 | A1* | 2/2021 | Brittain | G06T 7/0006 |
| 2021/0182001 | A1* | 6/2021 | Levant | G06T 7/0004 |
| 2021/0221152 | A1* | 7/2021 | Takahashi | B41J 2/2135 |

FOREIGN PATENT DOCUMENTS

JP 2017-092777 A 5/2017

* cited by examiner

*Primary Examiner* — David Perlman
(74) *Attorney, Agent, or Firm* — Venable LLP

(57) ABSTRACT

An image processing apparatus is an image processing apparatus configured to execute image processing based on image data obtained by reading a print image continuously printed on a printing medium, the print image being marked with one marker per inspection unit region, and the image processing apparatus including an obtaining unit configured to obtain data of an inspection target image obtained by reading the print image of the one inspection unit region and data of an adjacent image obtained by reading a region that is adjacent to the print image of the one inspection unit region in a conveyance direction of the printing medium and includes the marker, and a generating unit configured to generate an aligned image by aligning the inspection target image with a reference image based on the position of the marker on the inspection target image and the position of the marker on the adjacent image.

20 Claims, 28 Drawing Sheets

IMAGE PROCESSING APPARATUS, IMAGE PROCESSING METHOD, AND STORAGE MEDIUM

CROSS-REFERENCE TO PRIORITY APPLICATION

This application claims the benefit of Japanese Patent Application No. 2023-129323, filed Aug. 8, 2023, which is hereby incorporated by reference herein in its entirety.

BACKGROUND OF THE INVENTION

Field of the Invention

The present disclosure relates to image alignment processing for inspecting a printed material.

Description of the Related Art

In printing processing of forming an image on a printing medium, smudge of a color material such as ink or toner adhering to an unintended pace occurs in some cases. Furthermore, color fading occurs in some cases that a sufficient color material does not adhere to a place where an image is to be formed and color is more dilute than expected. Printing defects such as smudge and color fading degrades the quality of a printed material. Thus, the quality of the printed material needs to be guaranteed by inspecting existence of a printing defect. Visual inspection that existence of a printing defect is visually inspected needs large amounts of time and cost, and thus an inspection system that automatically performs inspection has been disclosed.

In such an inspection system, a scanned image obtained by scanning a printed material as an inspection target is aligned with, for example, a reference image registered in advance, and existence of a defect is detected based on difference there between. As disclosed in a patent document (Japanese Patent Laid-Open No. 2017-092777), a known method of the alignment is a method of reading position detection markers printed at the four corners of a sheet to obtain the shift amount of a printed material and performing geometric correction.

However, only one position detection marker is printed per inspection target unit in some cases to reduce the consumption amount of ink. In such a case, a shift of the sheet accumulates at a position separated from the marker, and the accuracy of alignment decreases, which has been a problem. In particular, in a case when a continuous sheet such as a roll sheet is used as a printing medium, the entire scanned image is potentially expanded and contracted due to desynchronization between the conveyance speed of the sheet and the scanning speed of a scanner. As a result, the shift amount becomes large at a position separated from the marker and the accuracy of alignment potentially decreases.

Summary of the Invention

An image processing apparatus of the present disclosure is an image processing apparatus configured to execute image processing based on image data obtained by reading a print image continuously printed on a printing medium, the print image is marked with one marker per inspection unit region, and the image processing apparatus includes an obtaining unit configured to obtain data of an inspection target image obtained by reading the print image of the one inspection unit region and data of an adjacent image obtained by reading a region that is adjacent to the print image of the one inspection unit region in a conveyance direction of the printing medium and includes the marker, and a generating unit configured to generate an aligned image by aligning the inspection target image with a reference image based on the position of the marker on the inspection target image and the position of the marker on the adjacent image.

Further features of the present invention will become apparent from the following description of exemplary embodiments with reference to the attached drawings.

DESCRIPTION OF THE EMBODIMENTS

Embodiments of the present disclosure will be described below with reference to the accompanying drawings. Note that the embodiments below do not limit the present disclosure and not all combinations of characteristics described in the present embodiment are necessarily essential to the present disclosure.

First Embodiment

In a first embodiment, a case when one reference position marker is printed at start of each page will be described below. In the present specification, a page is a print image per inspection unit region, and print images of a plurality of pages are continuously printed on a printing medium such as a roll sheet.

(Configuration of Printing System 1)

Figure 1:
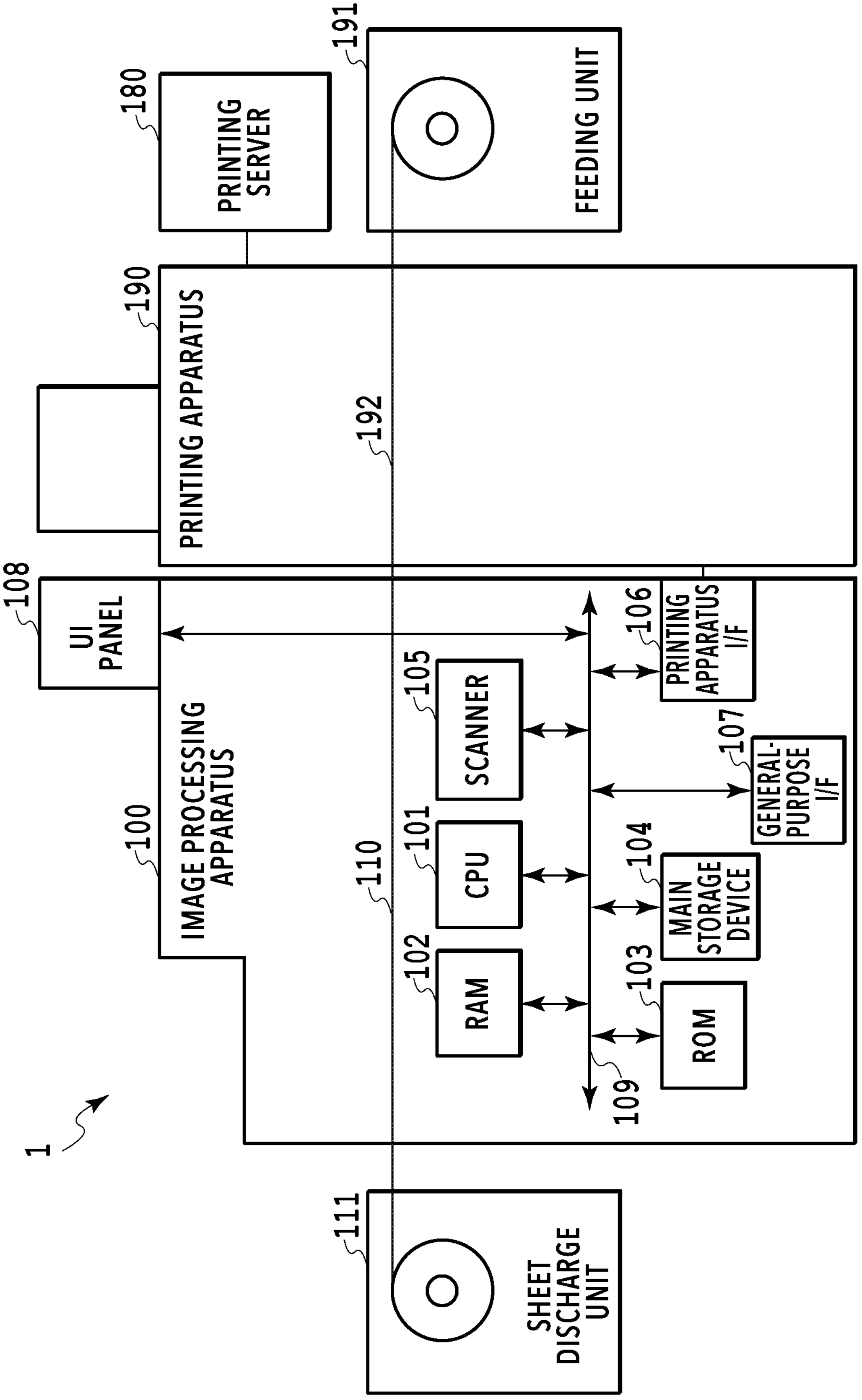
FIG. 1 is an entire configuration diagram of a printing system including an image processing apparatus.

FIG. 1 is a diagram illustrating an exemplary entire configuration of a printing system 1 including an image processing apparatus 100 of the present disclosure. As illustrated in the diagram, the printing system 1 includes the image processing apparatus 100, a printing server 180, and a printing apparatus 190. The printing server 180 has a function to generate a printing job of a document to be printed and input the printing job to the printing apparatus 190. The printing apparatus 190 has a function to form an image on a printing medium based on the printing job input from the printing server 180.

In the present embodiment, the printing medium is a continuous sheet such as a roll sheet. The printing medium is not limited to paper but includes ink-receptive materials such as vinyl, fabric, a plastic film, a metal plate, glass, ceramics, wood, and leather.

The printing apparatus 190 may be a printing apparatus of an ink jet printing scheme, an electrophotographic scheme, or the like. The present embodiment will be described for a printing apparatus of the ink jet printing scheme as an example. The printing apparatus 190 includes a feeding unit 191. The feeding unit 191 rotatably holds a roll sheet set in advance about a horizontal shaft and unwinds and supplies the roll sheet to the printing apparatus 190. Upon inputting of a printing job, while conveying the roll sheet set to the feeding unit 191 along a conveyance path 192, the printing apparatus 190 forms an image on a surface or both surfaces and transfers the roll sheet to the image processing apparatus 100.

The image processing apparatus 100 performs inspection processing of determining whether a defect exists on the roll sheet, in other words, a printed material on which the printing apparatus 190 forms an image and that is conveyed through the conveyance path 192. Accordingly, the image processing apparatus 100 functions as an inspection processing apparatus. The image processing apparatus 100 executes, as preprocessing of the inspection, aligned image generation processing of aligning a page to be inspected with an image (hereinafter referred to as a reference image) as a reference of the inspection. Details of the aligned image generation processing and the inspection processing will be described later.

The image processing apparatus 100 includes a CPU 101, a RAM 102, a ROM 103, a main storage device 104, an image reading apparatus 105, an interface (I/F) 106, a general-purpose I/F 107, a user interface (UI) panel 108, and a main bus 109 inside. The interface (I/F) 106 is an interface for the printing apparatus 190.

The image processing apparatus 100 also includes a conveyance path 110 and a sheet discharge unit 111. The conveyance path 110 is a path that is connected to the conveyance path 192 of the printing apparatus 190 and through which the printed material subjected to printing at the printing apparatus 190 is conveyed to the sheet discharge unit 111. The sheet discharge unit 111 winds the roll sheet subjected to printing at the printing apparatus 190 about a horizontal shaft.

The CPU 101 is a processor that performs overall control of components in the image processing apparatus 100. The CPU 101 loads a computer program held in the ROM 103, the main storage device 104, or the like, and executes various kinds of processing by using the RAM 102 as a work area. The RAM 102 includes a transitory storage region and functions as a main memory, a work area, or the like, of the CPU 101. The ROM 103 includes a non-transitory storage region and stores computer programs executed by the CPU 101.

The main storage device 104 stores computer programs executed by the CPU 101, data used for image processing, and the like. The computer programs include computer programs related to the inspection processing and the aligned image generation processing to be described later.

The scanner 105 reads, on the conveyance path 110, one surface or both surfaces of the printed material transferred from the printing apparatus 190, and inputs read image data to the CPU 101. In the present embodiment, the scanner 105 reads the printed material for each page in order from the first page of the printed material and stores read image data in the RAM 102 or the main storage device 104. The reading of the printed material at the scanner 105 will be described later.

The printing apparatus I/F 106 is connected to the printing apparatus 190, synchronizes processing timings with the printing apparatus 190, and transmit and receive information such as their operation situations with the printing apparatus 190. The general-purpose I/F 107 is a serial bus interface of USB, IEEE1394, or the like, and an external apparatus, a storage medium, or the like, is connectable through the general-purpose I/F 107. A user can write data such as a log to a storage medium or the like and transmit the data to an external apparatus, and can input data to the image processing apparatus 100.

The UI panel 108 includes a display device such as a liquid crystal display and functions as a user interface of the image processing apparatus 100. The UI panel 108 displays, on a display, information related to a current situation, setting, and an inspection result and input from the CPU 101. For example, the UI panel 108 displays image data of the printed material having passed inspection, image data of the printed material on which a defect is detected and that has failed inspection, image data of the detected defect, and the like, as the inspection result. Note that the inspection result is not limited to the two kinds of pass and failure but may be more finely classified.

The UI panel 108 also includes an input device such as a touch panel or various operation buttons, receives an instruction from the user, and inputs the instruction to the CPU 101. The main bus 109 connects components of the image processing apparatus 100.

The CPU 101 controls operation of components of the image processing apparatus 100 and the printing system 1. For example, the CPU 101 can synchronize conveyance speeds through the conveyance paths 110 and 192, change conveyance speed in accordance with an inspection result of the printed material, and stop conveyance. The image processing apparatus 100 may also include a GPU as an image processing processor in addition to the CPU 101.

While conveying the printed material transferred from the printing apparatus 190 through the conveyance path 110, the image processing apparatus 100 as a whole reads the printed material with the scanner 105 and performs image processing and the inspection processing described below on read image data.

An inspection result in the inspection processing is stored in the RAM 102 or the main storage device 104. Thereafter, the roll sheet is subjected to postprocessing such as cutting or blank run of removing unnecessary part of a label sheet from a releasing sheet. In the postprocessing, the printed material is selected based on the inspection result in the inspection processing. In this manner, only those with quality checked can be collected as deliverable items.

(Functional Configuration of Image Processing Apparatus 100)

Figure 2:
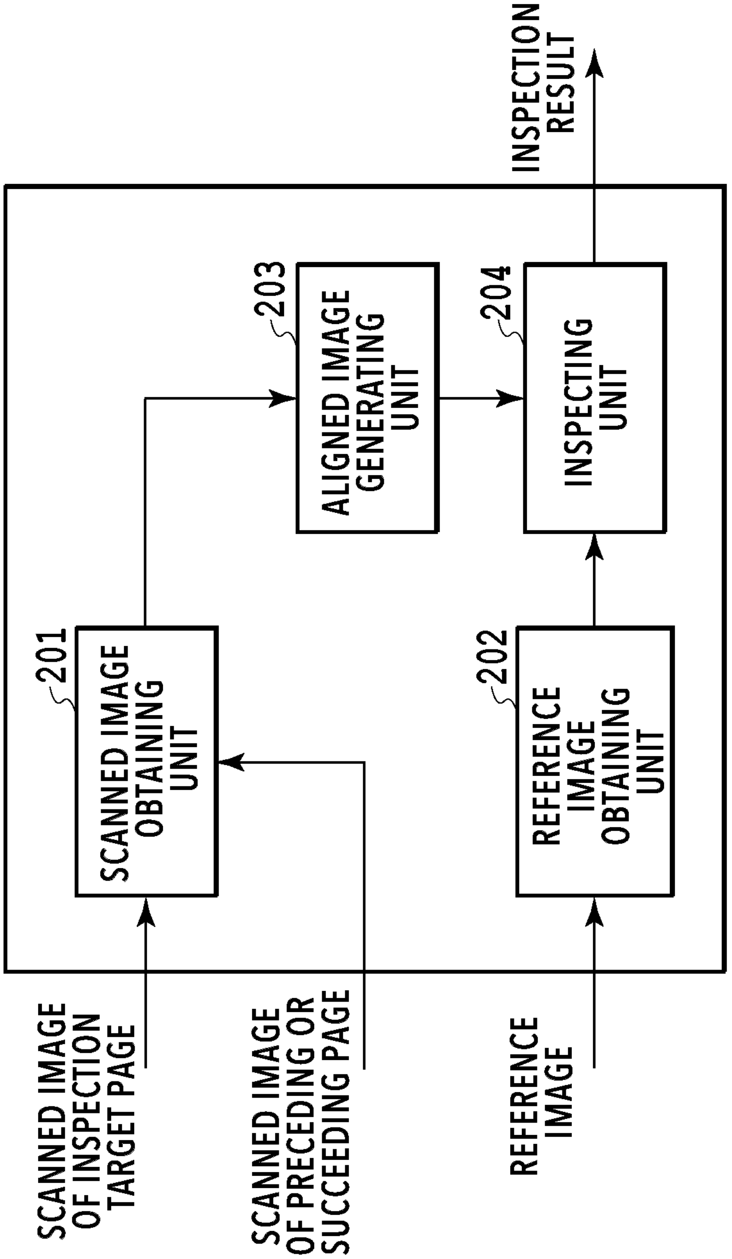
FIG. 2 is a block diagram illustrating a functional configuration of the image processing apparatus.

FIG. 2 is a block diagram illustrating an exemplary functional configuration of the image processing apparatus 100. Note that each component illustrated in FIG. 2 is implemented, for example, as a computer program for implementing its function is supplied to the image processing apparatus 100 and loaded and executed by the CPU 101 of the image processing apparatus 100. As illustrated in FIG. 2, the image processing apparatus 100 includes a scanned image obtaining unit 201, a reference image obtaining unit 202, an aligned image generating unit 203, and an inspecting unit 204.

The scanned image obtaining unit 201 obtains an inspection target image that is image data obtained by scanning a print image of an inspection target page, and an adjacent image that is image data obtained by scanning a region that is a region before or after the inspection target page and includes a reference position marker. The inspection target image and the adjacent image may be image data read by the scanner 105 or may be stored in the RAM 102 or the main storage device 104. The inspection target image and the adjacent image thus obtained are output to the aligned image generating unit 203.

Note that before and after a page correspond to before and after in a conveyance direction of the roll sheet. In the following description, an adjacent image scanned before the inspection target page is referred to as a preceding image, and an adjacent image scanned after the inspection target page is referred to as a succeeding image. The inspection target page is a page to be inspected and processed for all pages in order from the first page.

In the present embodiment, the reference position marker for alignment is printed at start of each page, and the scanned image obtaining unit 201 obtains the succeeding image as an adjacent image. Note that, in a case when the reference position marker is printed at end of each page, the scanned image obtaining unit 201 obtains the preceding image as an adjacent image. As for an adjacent image, image data of an entire page does not need to be read, and at least scanned image data of a region in which the reference position marker is printed on the succeeding page (or the preceding page) is obtained.

The scanned image obtaining unit 201 obtains the inspection target image and the adjacent image such that the inspection target image of one page (one inspection unit region) exists between two of the preceding and succeeding reference position markers. In other words, the adjacent image is read such that the reference position marker on the inspection target image and the reference position marker on the adjacent image are adjacent to each other through a print image of one inspection unit region.

The reference image obtaining unit 202 obtains image data (hereafter referred to as a reference image) as a reference of inspection, which is stored in the RAM 102 or the main storage device 104 in advance, and outputs the obtained reference image to the inspecting unit 204. The reference image will be described later.

The aligned image generating unit 203 generates an aligned image by aligning the inspection target image with the reference image based on the position of the reference position marker on the inspection target image obtained by the scanned image obtaining unit 201 and the position of the reference position marker on the adjacent image (in the first embodiment, the succeeding image). The generated aligned image is output to the inspecting unit 204. Details of the aligned image generation will be described later.

The inspecting unit 204 inspects whether a defect exists on the inspection target page by comparing the aligned image generated by the aligned image generating unit 203 and the reference image. As the inspection result, for example, result information on existence of a defect and defect image data indicating the position of a detected defect are output to the printing apparatus 190 or the UI panel 108. The inspection result outputting will be described later.

Note that, in the present embodiment, the scanned image obtaining unit 201, the reference image obtaining unit 202, the aligned image generating unit 203, and the inspecting unit 204 of the image processing apparatus 100 are included in one apparatus, but these functional components may be configured by combining a plurality of apparatuses. For example, a computer configured to perform processing up to aligned image generation and a computer configured to perform the inspection processing may be configured by separate computers.

(Operation of Image Processing Apparatus 100)

Figure 3:
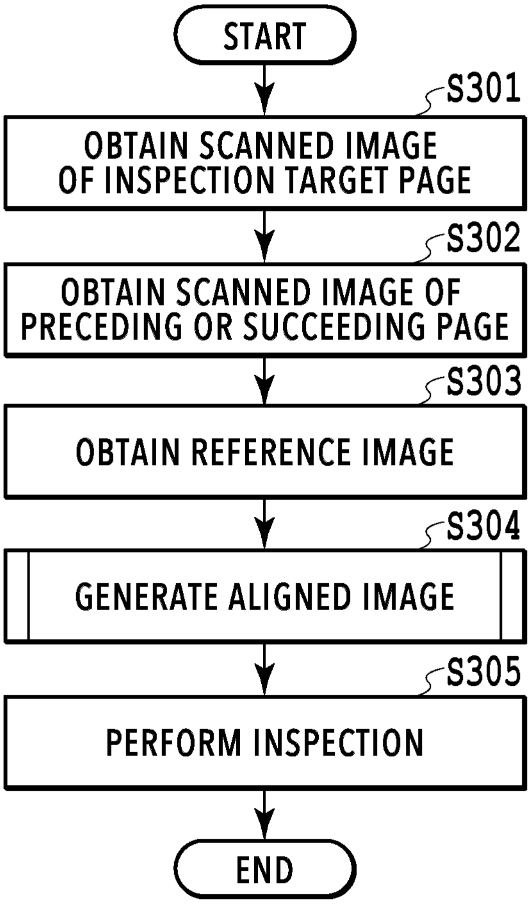
FIG. 3 is a flowchart illustrating the entire process of image processing executed by the image processing apparatus.

Operation of the image processing apparatus 100 will be described below. FIG. 3 is a flowchart illustrating the entire process of the image processing executed by the image processing apparatus 100. The CPU 101 reads a computer program that can implement the flowchart illustrated in FIG. 3 from the RAM 102 or the main storage device 104, loads the computer program onto the RAM 102, and executes the computer program, thereby implementing each function. Note that "S" in the following description represents a step.

Before a description of FIG. 3, the positional relation between a print head 402 and the scanner 105 of the printing apparatus 190 in the present embodiment and the conveyance direction of the roll sheet will be described below with reference to FIG. 4A.

Figure 4A:
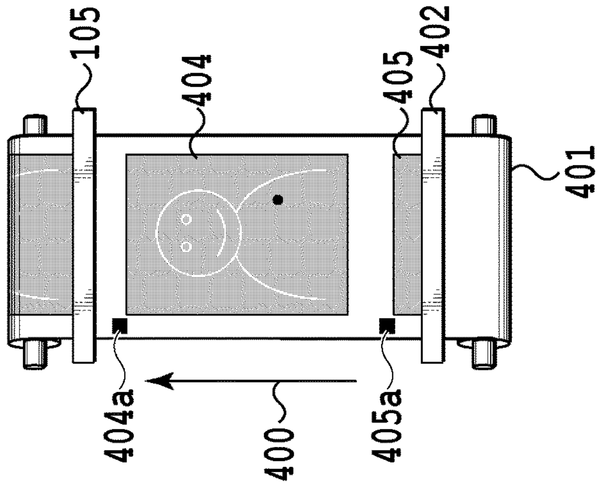
FIGS. 4A to 4D are diagrams for description of print image scanning.

As illustrated in FIG. 4A, the print head 402 of the printing apparatus 190 is vertically provided in a conveyance direction 400 of a roll sheet 401. The scanner 105 is vertically provided in the conveyance direction 400 of the roll sheet 401 on the front side of the print head 402 in the conveyance direction 400. A direction illustrated with arrow 400 in the drawing is the conveyance direction of the roll sheet 401. Ink is discharged from a plurality of discharge ports provided at the print head 402 onto the roll sheet 401 being conveyed, and accordingly, a print image 404 is formed on the roll sheet 401.

The scanner 105 scans, for each page, an image printed on the roll sheet 401. The scanner 105 is, for example, a full-line sensor in which a plurality of detection elements are disposed across a width equal to or greater than the size of the roll sheet in the width direction.

The scanning speed of the scanner 105 is synchronized and matched with the conveyance speed of the roll sheet. Specifically, reading speed per image line (scanning speed [line/msec]) and conveying speed per image line (conveyance speed [line/msec]) are adjusted to match each other. However, in actual operation, desynchronization with the scanning speed occurs due to rotational speed variation of conveyance rollers in some cases. In a case when the desynchronization occurs, the entire scanned image is expanded or contracted in the conveyance direction. Furthermore, deflection occurs depending on the material of the roll sheet 401, or the like, and local distortion occurs to the scanned image in some cases.

Figure 4B:
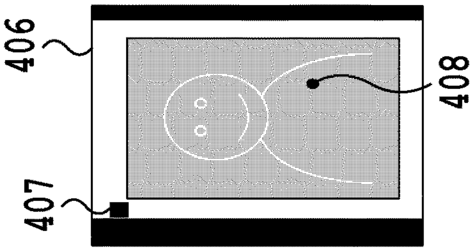

FIG. 4B is a diagram illustrating an exemplary scanned image 406 obtained by reading the print image 404 on the roll sheet 401 with the scanner 105. The scanned image 406 expanded in the longitudinal direction is obtained because of the above-described desynchronization between the scanning speed and the conveyance speed. This corresponds to a case when the roll sheet conveyance speed is slower than the scanning speed. In a case when the roll sheet conveyance speed is faster than the scanning speed, a scanned image shortened in the longitudinal direction is obtained.

The scanned image 406 illustrated in FIG. 4B is scanned with the position of the entire roll sheet 401 being shifted in the right direction due to positional shift in the roll sheet width direction during roll sheet conveyance. In the scanned image 406 in FIG. 4B, black regions at both ends are pixels corresponding to outside regions of the roll sheet 401. In a case when the roll sheet 401 is shifted in the right direction, the black region on the right side is scanned to be narrower than the black region on the left side in this manner.

In the present embodiment, reference position marker 404*a*, 405*a*, . . . are printed at upper-left parts of print images 404, 405, . . . of respective pages as illustrated in FIG. 4A. In the scanned image 406 in FIG. 4B, a marker image 407 illustrating the reference position marker 404*a* of the print image 404 as the inspection target page is scanned. The reference position marker 405*a* on the print image 405 of the succeeding page is scanned like a marker image 410 on a scanned image 409 of the succeeding page illustrated in FIG. 4C.

Processing illustrated in a flowchart in FIG. 3 under such a condition will be described below.

At S301, the CPU 101 (scanned image obtaining unit 201) obtains the scanned image (inspection target image) 406 of the inspection target page stored in the RAM 102 or the main storage device 104.

As described above, the inspection target image 406 is expanded in the longitudinal direction due to the desynchronization between the scanning speed and the conveyance speed and scanned with the roll sheet being shifted in the right direction due to the positional shift in the roll sheet width direction. The inspection target image 406 includes the marker image 407 corresponding to the reference position marker 404*a* on the inspection target page 404. The inspection target image 406 includes a point defect 408. The defect 408 is, for example, a droplet of ink dropping from the print head 402 and unintentionally adhering to the printed material.

At S302, the CPU 101 (scanned image obtaining unit 201) obtains scanned image data (succeeding image 409) of the succeeding page of the inspection target page stored in the RAM 102 or the main storage device 104.

Figure 4C:
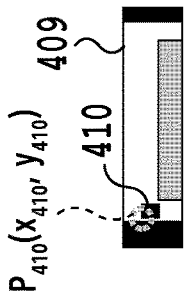

FIG. 4C illustrates an exemplary succeeding image 409. In the present embodiment, since one reference position marker is printed at start (upper-left part) of each page, the CPU 101 obtains, as the succeeding image 409, an image region near start of the print image 405 of the succeeding page including the reference position marker 410 at least. The CPU 101 obtains, as the succeeding image 409, for example, a scanned image of a predetermined length including a margin corresponding to shift size.

Note that, similarly to the inspection target image 406, the succeeding image 409 is scanned as an image expanded in the longitudinal direction of the image due to the desynchronization between the scanning speed and the roll sheet conveyance speed. Furthermore, the roll sheet on the succeeding image 409 is shifted in the right direction due to positional shift in the roll sheet width direction.

At S303, the CPU 101 (reference image obtaining unit 202) obtains reference image data (hereinafter referred to as a reference image 501) stored in the RAM 102 or the main storage device 104. The reference image 501 is image data as an inspection reference.

Figure 5B:
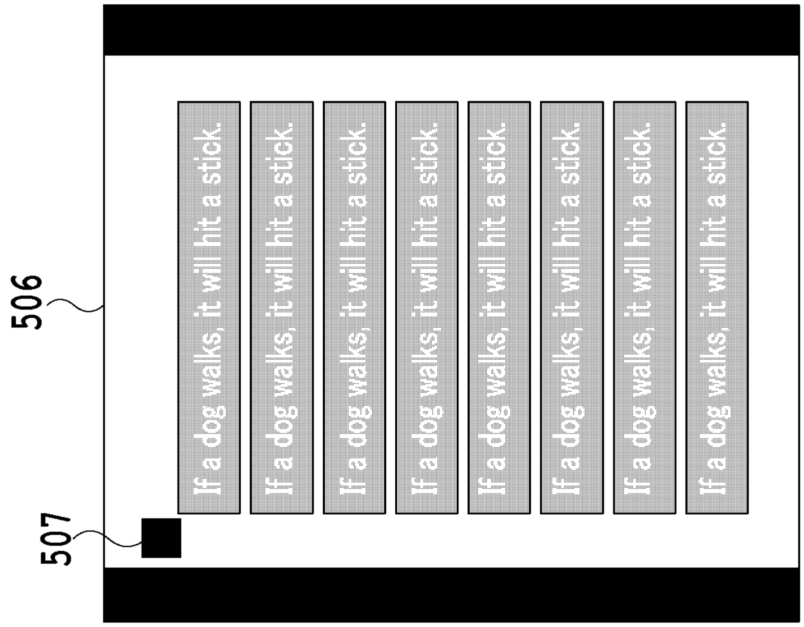
FIGS. 5A and 5B are diagrams illustrating an exemplary reference image.
Figure 5A:
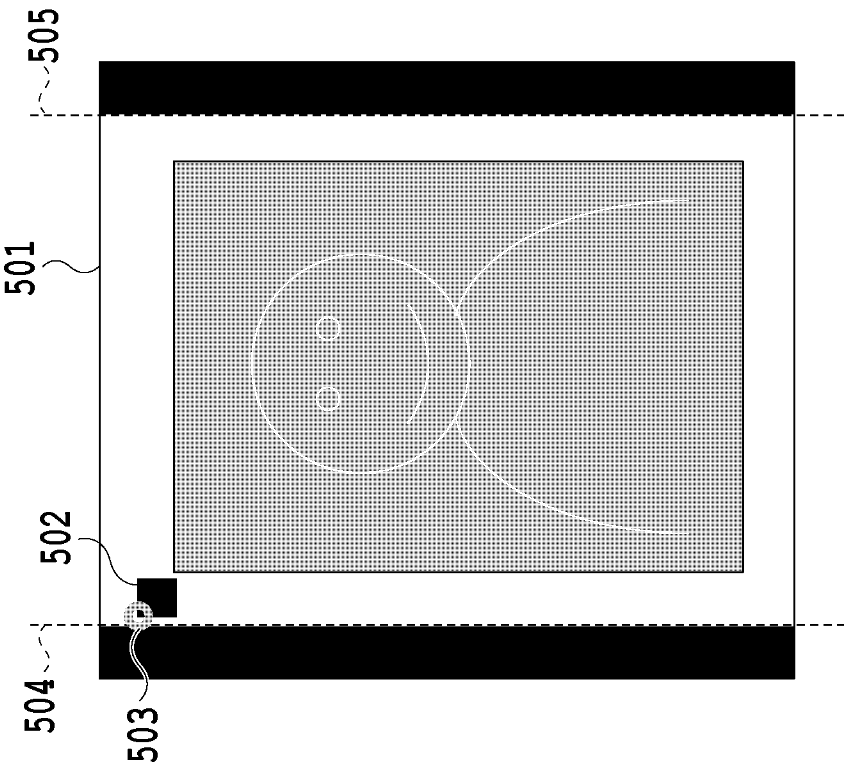

FIG. 5A is a diagram illustrating an exemplary reference image 501. The reference image 501 is an image that includes no defect and in which the right and left ends of a reference position marker 502 and the roll sheet are aligned with a reference position thereof. The reference position is determined from a designed value of the pixel position of the reference position marker on a scanned image and designed values of the pixel positions of the right and left ends of the roll sheet. These designed values are calculated from document data, printing job information, and scanning timing of the printed material.

For example, the reference position is scanning data of the 59-th line (=2.5 mm/25.4*600 dpi) in a case when the document data is A3 (297×420 mm) size, the printing job information includes settings of top, bottom, right, and left margin regions of 10 mm, a printing position of the reference position marker printed with a center 5×5 mm of a 10×10 mm margin region at an upper-left part of the document data, and a conveyance speed of 16 [line/msec](=16/600 dpi*25.4 [mm/msec]) of the roll sheet, and scanning is performed at the scanning resolution of 600×600 dpi and the scanning speed of 16 [line/msec].

In the present embodiment, the reference image 501 is aligned such that the upper-left edge of the reference position marker 502 is at a point 503, the left end of the roll sheet is on a straight line 504, and the right end thereof is on a straight line 505. Although one reference position marker is printed per page, a reference image 506 in which a plurality of printed materials is collectively set as one inspection unit region may be used in a case when a printed material that is short in the conveyance direction of the roll sheet is continuously printed as illustrated in FIG. 5B.

With the reference image 506 in this case, a scanned image of a print image on which one reference position marker 507 is printed per inspection unit region, may be aligned with the reference position. Thus, "page" in the following description may be interpreted as "inspection unit region".

Note that, in the present specification, a coordinate system on the reference image 501 illustrated in FIG. 5A or the reference image 506 illustrated in FIG. 5B is a reference coordinate system. For example, longitudinal expansion or contraction of a scanned image (such as the inspection target image or the succeeding image) obtained by the scanned image obtaining unit 201 is expansion or contraction relative to the reference image 501 or 506. Similarly, width directional shift on the scanned image is width directional shift relative to the reference image 501 or 506. The Y direction of the reference coordinate system is the conveyance direction of the roll sheet, and the X direction thereof is a direction orthogonal to the conveyance direction.

The Y coordinate of the reference coordinate system is a designed value determined by the vertical size of the document data of the printed material, the sheet size of the printing job information, and the scanning timing of the scanner 105. The X coordinate of the reference coordinate system is a designed value determined by the horizontal size of the document data of the printed material, the sheet size of the printing job information, and the resolution of the scanner 105.

At S304, the CPU 101 (aligned image generating unit 203) executes the aligned image generation processing. In the aligned image generation processing, the CPU 101 detects one reference position marker from each of the inspection target image and the succeeding image obtained at S301 and S302. The CPU 101 generates an image (hereafter referred to as an aligned image) by aligning the inspection target image with the above-described reference positions 503, 504, and 505 based on the positions of the detected reference position markers.

Details of the aligned image generation processing will be described later with reference to FIG. 6. The positions of the right and left ends of the roll sheet and the reference position marker are aligned on the generated aligned image and the reference images 501 and 506.

At S305, the CPU 101 (inspecting unit 204) inspects whether a defect exists on a print image of the inspection target page by pixel value comparison between the aligned image generated at S304 and the reference image obtained at S303. The CPU 101 (inspecting unit 204) generates a defect image 701 illustrating the pixel region of the detected defect 408 as in FIG. 7, for example, outputs the defect image 701 as an inspection result to the printing apparatus 190 or the UI panel 108, and then ends the processing of the present flowchart.

(S304: Aligned Image Generation Processing)

Details of the aligned image generation processing at S304 will be described below with reference to a flowchart in FIG. 6. Processing at each step in the flowchart in FIG. 6 is executed by the CPU 101 (the aligned image generating unit 203 in FIG. 2) of the image processing apparatus 100.

At S601, the CPU 101 detects a marker position on the inspection target page. For example, in a case when the inspection target image 406 illustrated in FIG. 4B is obtained, the CPU 101 performs edge detection processing on the inspection target image 406 and detects pixels at edge parts of a reference position marker 407 on the inspection target image 406. The edge detection processing may be Sobel filter processing, Harris corner detection processing, or any other well-known processing.

Figure 4D:
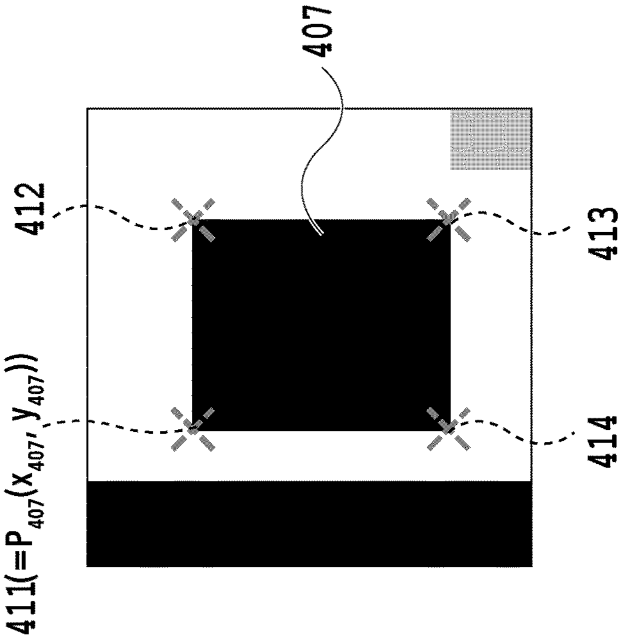

FIG. 4D is an enlarged view of the vicinity of the reference position marker 407 on the inspection target image 406. As illustrated in FIG. 4D, pixels 411 to 414 at upper-left, upper-right, lower-right, and lower-left edge parts of the reference position marker 407 are detected by the edge detection processing. In the present embodiment, the CPU 101 detects, as a representative position $P_{407}$ ($x_{407}$, $y_{407}$) of the reference position marker 407, the position of the pixel 411 of the upper-left edge among the detected pixels 411 to 414 at the edge parts. The CPU 101 stores the representative position $P_{407}$ ($x_{407}$, $y_{407}$) of the reference position marker 407 detected from the inspection target image 406 in a predetermined storage region (for example, the RAM 102).

At S602, the CPU 101 determines whether the inspection target image 406 is a start page or end page of printing. In the present embodiment, since the reference position marker is printed at start of each page, whether the inspection target image 406 is the end page is determined at S602. In a case when the inspection target image 406 is the end page, no reference position marker is printed thereafter and thus the CPU 101 proceeds to S603. In a case when the inspection target page is not the end page, the CPU 101 determines that the reference position marker is printed on the succeeding page, and then proceeds to S604.

Note that, in a case when the reference position marker is printed at end of each page, the CPU 101 determines whether the inspection target image 406 is a start page at S602, and then proceeds to S603 in a case when the inspection target image 406 is a start page. In a case when the inspection target image 406 is not a start page, the CPU 101 proceeds to S604.

At S603, the CPU 101 estimates a marker position on the page preceding the start page or succeeding the end page. In the present embodiment, no reference position marker is printed on the succeeding page of the end page. Thus, a representative position of the reference position marker on the succeeding page is estimated based on the representative position of the reference position marker 407 of the inspection target image 406 detected at S601.

Specifically, the CPU 101 calculates the relative distance between the reference position markers on pages from the document data and printing job information of the printed material. For example, the relative distance is 420 mm+10 mm=430 mm in a case when the document data is A3 (297 mm×420 mm) size and the printing job information includes settings of top, bottom, right, and left margin regions of 10 mm.

The CPU 101 estimates a position $P_{410}$ ($x_{410}$, $y_{410}$) of the reference position marker 410 on the succeeding page by adding the calculated relative distance to the representative position $P_{407}$ of the reference position marker 407 on the inspection target image 406. The CPU 101 stores the estimated position $P_{410}$ ($x_{410}$, $y_{410}$) of the reference position marker 410 on the succeeding page in a predetermined storage region (for example, the RAM 102).

Note that, in a case when the inspection target image is a scanned image of the start page, the CPU 101 subtracts the calculated relative distance between the reference position markers on pages from the representative position $P_{407}$ of the reference position marker 407 on the inspection target image 406. Accordingly, the pixel position of the reference position marker on the preceding page is estimated.

The method of estimating a marker position on the preceding or succeeding page is not limited to the above-described addition and subtraction of the relative distance between the reference position markers on pages. The estimation may be performed with consideration on, for example, information of sheet expansion and contraction or a marker detected position on the preceding or succeeding page detected for the previous page.

At S604, the CPU 101 detects a marker position on the preceding or succeeding page. In the present embodiment, the scanned image (succeeding image) 409 of the succeeding page illustrated in FIG. 4C is provided with the edge detection processing to detect pixels at edge parts of the reference position marker 410 on the succeeding image 409. Similarly to S601, the position of the pixel at the upper-left edge part among the detected pixels at the edge parts is detected as the representative position $P_{410}$ ($x_{410}$, $y_{410}$) of the reference position marker 410. The CPU 101 stores the detected representative position $P_{410}$ ($x_{410}$, $y_{410}$) of the reference position marker 410 on the succeeding page in a predetermined storage region (for example, the RAM 102).

Figure 8:
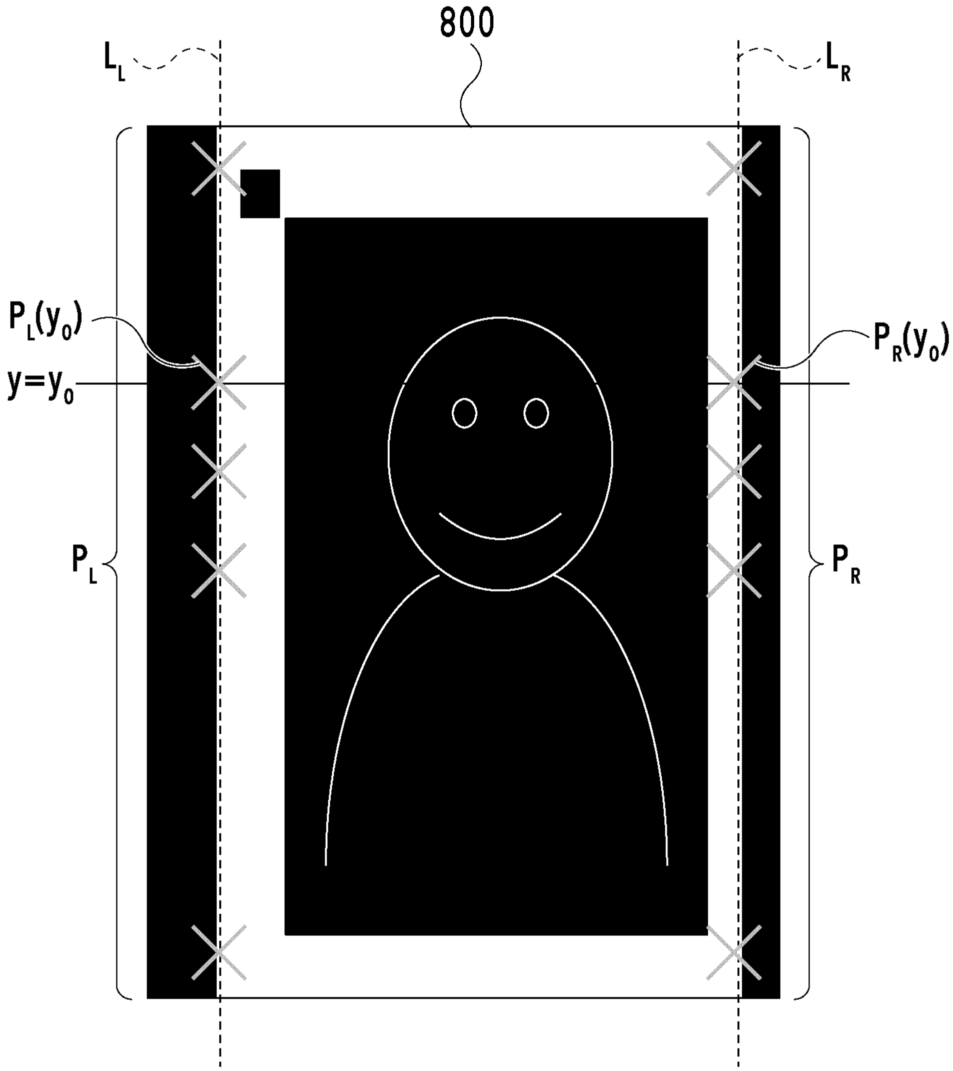
FIG. 8 is a diagram illustrating an exemplary binarized image detected by right-left sheet end detection processing.

At S605, the CPU 101 generates a binarized image of the inspection target page. Specifically, the CPU 101 generates the binarized image by binarizing the inspection target image 406 by a method such as a mode method or an Otsu method. Through the processing at S605, for example, a binarized image 800 illustrated in FIG. 8 is generated. In the binarized image 800, white regions at the right and left ends of the roll sheet are converted into white pixels with the pixel value of "255".

At S606, the CPU 101 detects the right and left ends of the sheet from the binarized image 800 generated at S605. The CPU 101 detects, as a pixel position $P_L$ ($y_0$) at the left end of the sheet, for example, a pixel position with a minimum X coordinate at the pixel position of $y=y_0$ among pixels with the pixel value of "255" in the binarized image 800. The CPU 101 calculates an approximate straight line $L_L$ representing the left end of the sheet from a point group $P_L$ of pixel positions at the left end of the sheet, which are detected for respective y pixel positions, by approximation processing such as linear regression processing.

Similarly, the right end of the sheet, the CPU 101 detects, as a pixel position $P_R$ ($y_0$) at the right end of the sheet, a pixel position with a maximum X coordinate at the pixel position of $y=y_0$ among pixels with the pixel value of "255". The CPU 101 calculates an approximate straight line $L_R$ representing the right end of the sheet from a point group $P_R$ of pixel positions at the right end of the sheet, which are detected for respective y pixel positions.

At S607, the CPU 101 determines the positions of the four corners of the inspection target page. The CPU 101 calculates the positions of the four corners of the inspection target page based on the representative positions $P_{407}$ ($x_{407}$, $y_{407}$) and $P_{410}$ ($x_{410}$, $y_{410}$) of the reference position markers 407 and 410 detected and estimated from the inspection target image 406 and the succeeding image 409, and the approximate straight lines $L_L$ and $L_R$ at the right and left ends of the sheet.

Figure 9A:
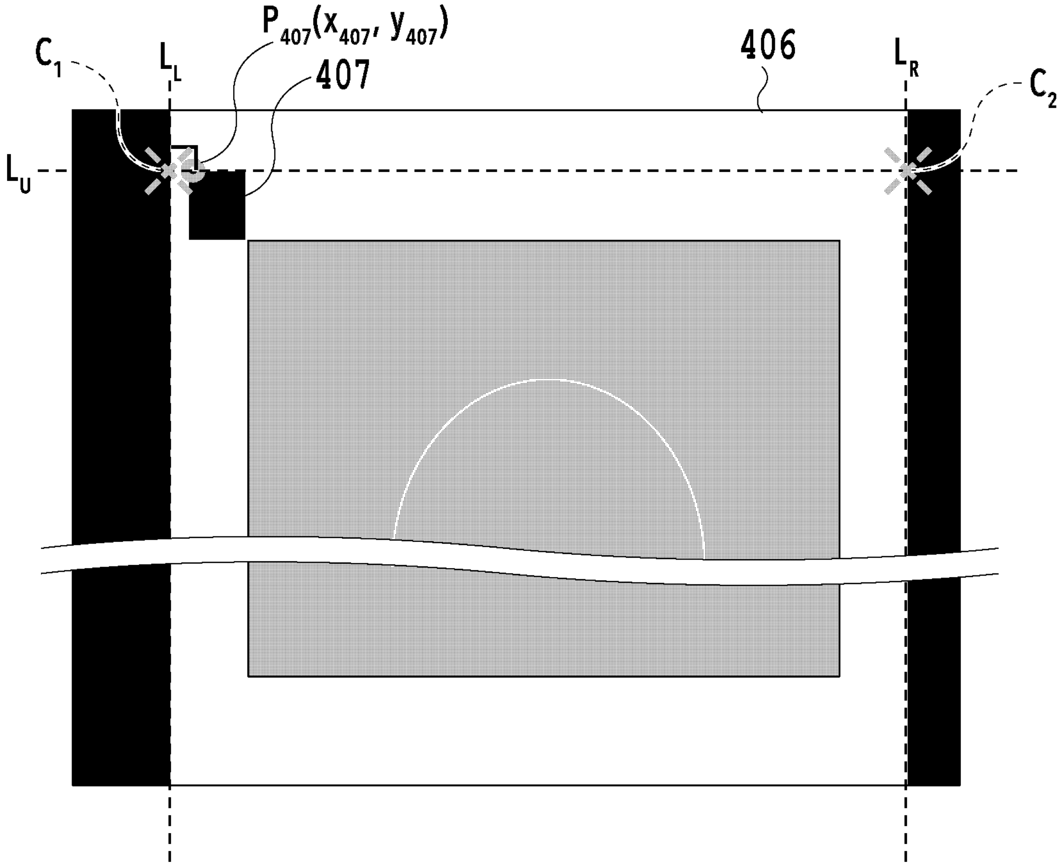
FIGS. 9A and 9B are diagrams illustrating exemplary four corners of an inspection target page.

In the present embodiment, points $C_1$ and $C_2$ illustrated in FIG. 9A are calculated as the upper-left and upper-right corners of the inspection target page. The point $C_1$ is an intersection point of the approximate straight line $L_L$ at the left end of the sheet and a straight line $L_U$ orthogonal thereto and passing through the representative position $P_{407}$ ($x_{407}$, $y_{407}$) of the reference position marker 407 on the inspection target image 406. The point $C_2$ is an intersection point of the straight line $L_U$ and the approximate straight line $L_R$ at the right end of the sheet.

Figure 9B:
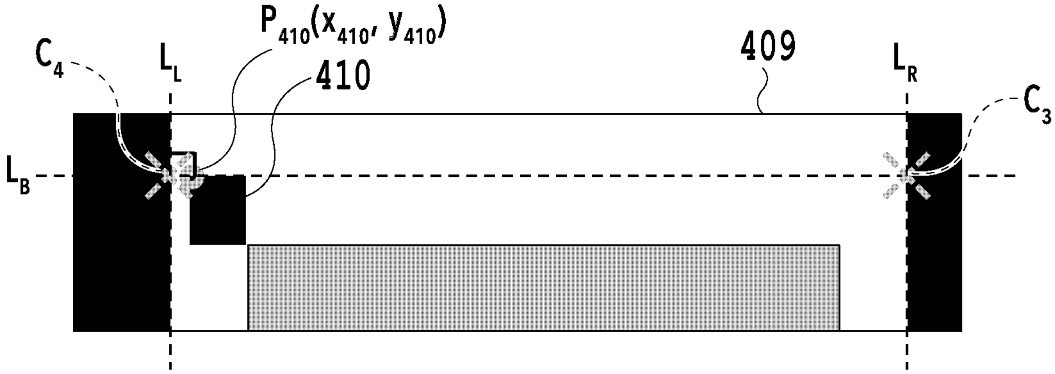

The CPU 101 calculates points $C_4$ and $C_3$ illustrated in FIG. 9B as the lower-left and lower-right corners of the inspection target page. The point $C_4$ is an intersection point of the approximate straight line $L_L$ at the left end of the sheet and a straight line $L_B$ orthogonal thereto and passing through the representative position $P_{410}$ ($x_{410}$, $y_{410}$) of the reference position marker 410 on the succeeding image 409. The point $C_3$ is an intersection point of the straight line $L_B$ and the approximate straight line $L_R$ at the right end of the sheet. In this manner, the intersection points $C_1$ to $C_4$ are calculated as the positions of the four corners of the inspection target page. Accordingly, the reference position marker 410 on the succeeding page is used to determine the positions of the four corners of the inspection target page.

At S608, the CPU 101 aligns the inspection target image 406 acquired by scanning with a reference position based on the positions of the four corners $C_1$ to $C_4$ of the inspection target page determined at S607. In the present embodiment, the pixel positions of the points $C_3$ and $C_4$ determined from the succeeding image 409 are converted into pixel positions on the inspection target image 406 based on the document data and printing job information of the printed material and scanning timing.

Specifically, the pixel position of the intersection point C3 is (7313 pixel≈7620−297/254*600)/2−1, 10216 pixel≈59−430/254*600) and the pixel position of the intersection point C4 is (303 pixel≈(7620−297/254*600)/2+1, 10216 pixel) in a case when the document data is A3 (297×420 mm) size, the printing job information includes settings of top, bottom, right, and left margin regions of 10 mm, a printing position of the reference position marker printed with a center 5×5 mm of a 10×10 mm margin region at an upper-left part of the document data, a conveyance position where the roll sheet is conveyed at the center in the right-left direction, and a conveyance speed of 16 [line/msec](=16/600 dpi*25.4 [mm/msec]), and scanning is performed with pixels 7620 pixel in the lateral direction at the scanning resolution of 600×600 dpi of a line scanner and the scanning speed of 16 [line/msec].

Figure 10B:
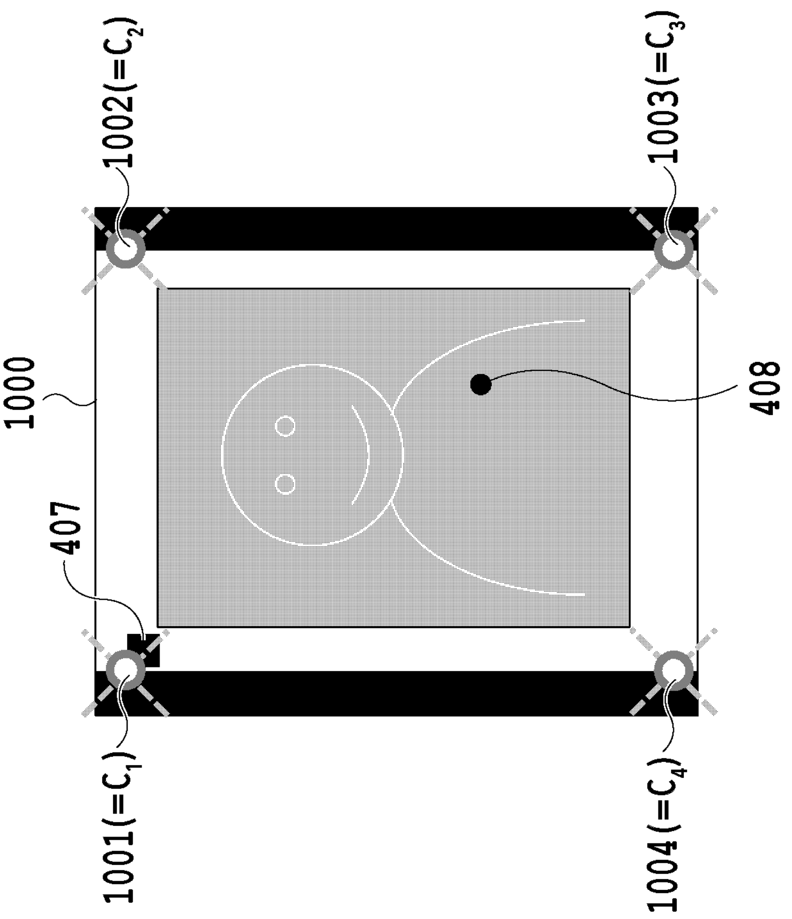
FIGS. 10A and 10B are diagrams illustrating exemplary alignment to a reference position.
Figure 10A:
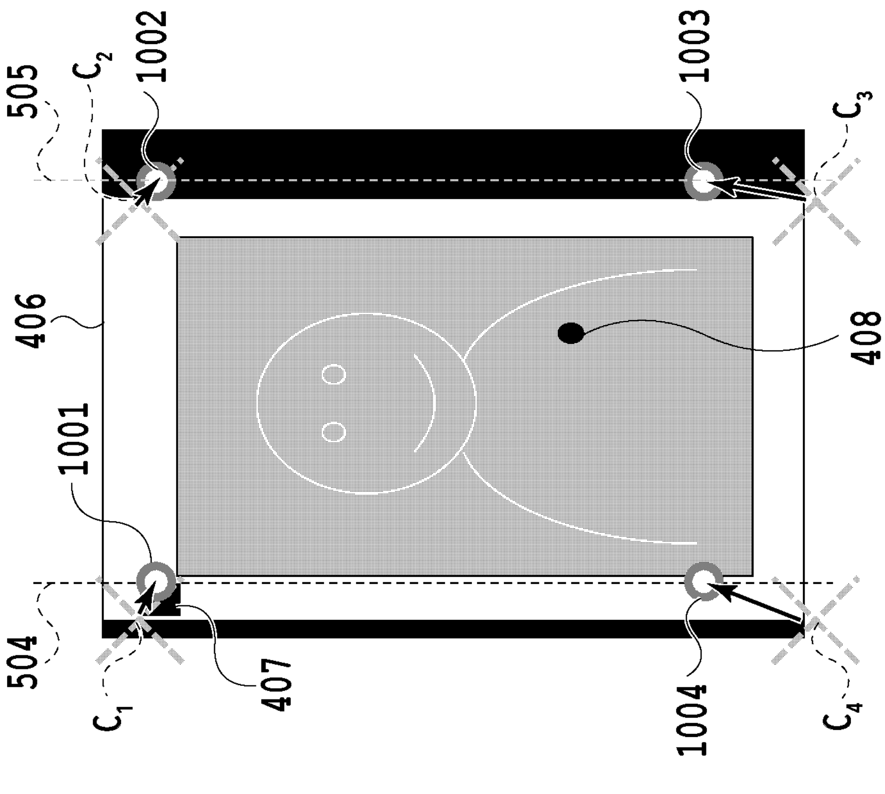

The CPU 101 further aligns, with the positions of points 1001 to 1004 illustrated in FIG. 10A, the upper-left and upper-right corner positions $C_1$ and $C_2$ of the inspection target image 406 and the lower-right and lower-left corner positions $C_3$ and $C_4$ converted into pixel positions on the inspection target image. The alignment can be performed by using well-known geometric transform processing such as affine transform or projection transform.

The points 1001 to 1004 are designed values of the positions of the four corners of the inspection target page on a scanned image, which are calculated from the document data and printing job information of the printed material and scanning timing. The points 1001 and 1004 are points on the straight line 504 at the left end of the roll sheet on the reference image 501 illustrated in FIG. 5A. The points 1002 and 1003 are points on the straight line 505 at the right end of the roll sheet on the reference image 501. The y coordinates of the points 1001 and 1002 are the same as the y coordinate of the point 503 as a designed value of the position of the upper-left corner of the reference position marker printed at start of a page. The y coordinates of the points 1003 and 1004 are coordinates shifted downward from the y coordinate of the point 503 by the page height.

Through the above-described geometric transform processing, alignment is performed such that the upper-left edge $P_{407}$ of the reference position marker 407 on the inspection target image 406 is on the point 503, the left end $L_L$ of the roll sheet is on the straight line 504, and the right end $L_R$ of the roll sheet is on the straight line 505. As a result, as illustrated in FIG. 10B, the inspection target image (aligned image 1000) is aligned with the same reference position as the reference image 501 illustrated in FIG. 5A.

At S609, the CPU 101 detects characteristic points on the aligned image 1000 generated at S608 and the reference image 501 and aligns the detected characteristic points with each other. Well-known characteristic point detection processing such as Sobel filter processing or Harris corner detection processing may be used for the characteristic point detection. In addition, well-known feature amount matching processing such as an AKAZE method or K-nearest neighbors may be used for matching of characteristic points. Well-known geometric transform processing such as affine transform or projection transform is performed for alignment of characteristic points.

Through the above-described processing, the CPU 101 generates the aligned image 1000 by aligning the inspection target image 406 with the reference image 501.

Figure 11:
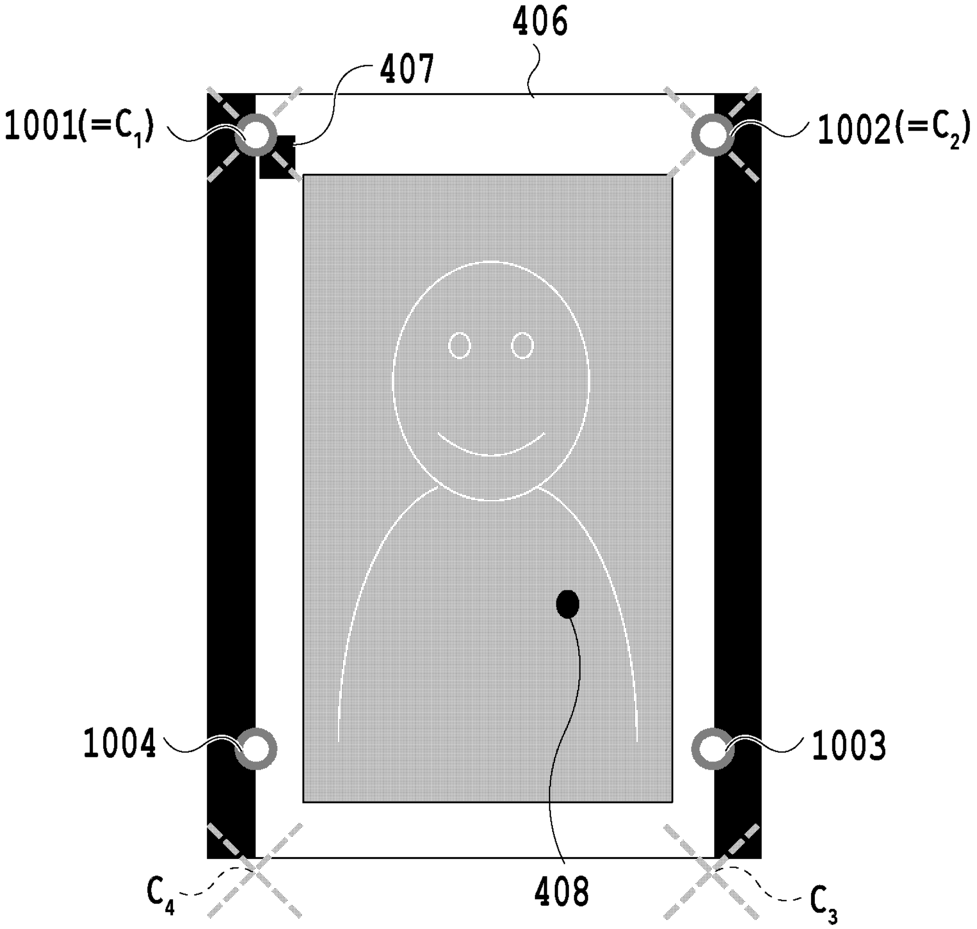
FIG. 11 is a diagram illustrating exemplary alignment processing using only one reference position marker.

In an example described in the present embodiment, a scanned image is expanded in the longitudinal direction as illustrated in FIGS. 4B and 4C due to the desynchronization between the speed of scanning the printed material with the scanner 105 and the speed of roll sheet conveyance by the printing apparatus 190. In this case, an image as illustrated in FIG. 11 is obtained in a case when the scanned image is aligned with the reference position only based on a detected position of one reference position marker 407 printed at start of each page.

Specifically, the intersection points $C_1$ and $C_2$ can be aligned with the points 1001 and 1002 as designed values at the upper-left and upper-right corners of the inspection target page based on the detected position of the reference position marker 407, but alignment is not performed with expansion and contraction in the longitudinal direction taken into account. Thus, positional shift from the reference image occurs at a lower part of the scanned image.

However, in a case when the inspection target image is aligned with the reference position based on detected positions of the reference position marker 407 on the inspection target page and the reference position marker 410 on the succeeding page, highly accurate alignment can be performed with expansion and contraction in the longitudinal direction taken into account as illustrated in FIG. 10B.

Note that the inspection processing at S305 is performed by using the aligned image 1000 generated at S609. In the inspection processing, the image processing apparatus 100 inspects whether a defect exists on the print image of the inspection target page by comparing the pixel values of corresponding pixels in the aligned image 1000 generated at S609 and the reference image 501 illustrated in FIG. 5A. As a result, for example, the defect 408 illustrated in FIG. 4B is detected. The CPU 101 generates the defect image 701 (FIG. 7) in which the position of the defect 408 is clearly indicated with a mark, a color, or the like, and outputs the defect image 701 to the printing apparatus 190 or the UI panel 108 together with information of defect existence.

Through the image processing as described above, even in a case when one reference position marker is printed on each page, the scanned image (inspection target image) of the printed material on the inspection target page can be highly accurately aligned with the reference image by using the reference position markers printed on the inspection target page and the preceding or succeeding page thereof. As a result, a defect such as smudge in the inspection target page is highly accurately detected.

Note that, in the above-described example, since the reference position marker is printed at start of each page, the reference position marker on the succeeding page that is a page adjacent in the conveyance direction of the roll sheet through the inspection target page is used for alignment. Similarly, in a case when one reference position marker is printed at end of each page, the reference position marker on the preceding page that is a page adjacent in the conveyance direction of the roll sheet through the inspection target page can be used to highly accurately align the inspection target image with the reference image.

In a case when the inspection target page is the end page, a marker position on the succeeding page of the end page is estimated and used based on the relative distance between the reference position markers on pages, which is calculated from the document data and printing job information of the printed material. Similarly, in a case when the inspection target page is the start page, a marker position on the preceding page of the start page may be estimated based on the relative distance between the reference position markers on pages, which is calculated from the document data and printing job information of the printed material, to perform alignment.

Note that, in a case when the length of the end page in the conveyance direction of the roll sheet is longer than a predetermined threshold value, the desynchronization between the speed of scanning the printed material with the scanner 105 and the speed of roll sheet conveyance by the printing apparatus 190 accumulates and the accuracy of estimating a marker position on the succeeding page decreases. In this case, the CPU 101 may warn and notify the user that the estimation accuracy decreases.

The CPU 101 may store history data of the detected position of the reference position marker detected on the preceding page of the inspection target page in the RAM 102. In a case when the currently detected pixel position of the reference position marker is an outlier as compared to history data, the CPU 101 may use a pixel position estimated from the history data in place of the pixel position of the reference position marker as the outlier. According to the present disclosure, an image obtained by reading the printed material can be highly accurately aligned with an inspection reference image even in a case when only one marker is printed per inspection unit region.

Modification of First Embodiment

A modification of the first embodiment will be described below with reference to FIGS. 12A to 12C. The modification will be described for an example in which alignment is performed by using markers printed at start of the start page for other usage such as discharge position error correction of colors. One reference position marker is printed at end of each page other than the start page.

Figure 12A:
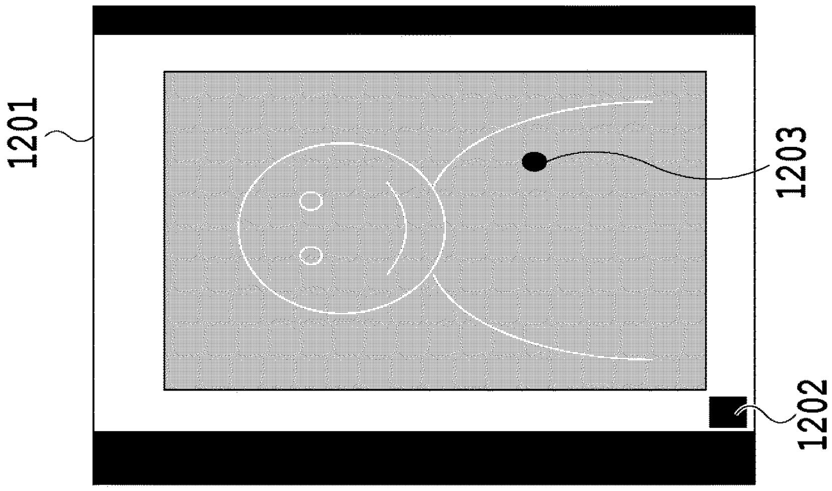
FIGS. 12A to 12C are diagrams illustrating exemplary scanned image data of Modification 1.
Figure 12B:
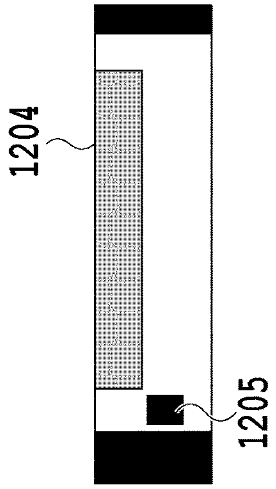
Figure 12C:
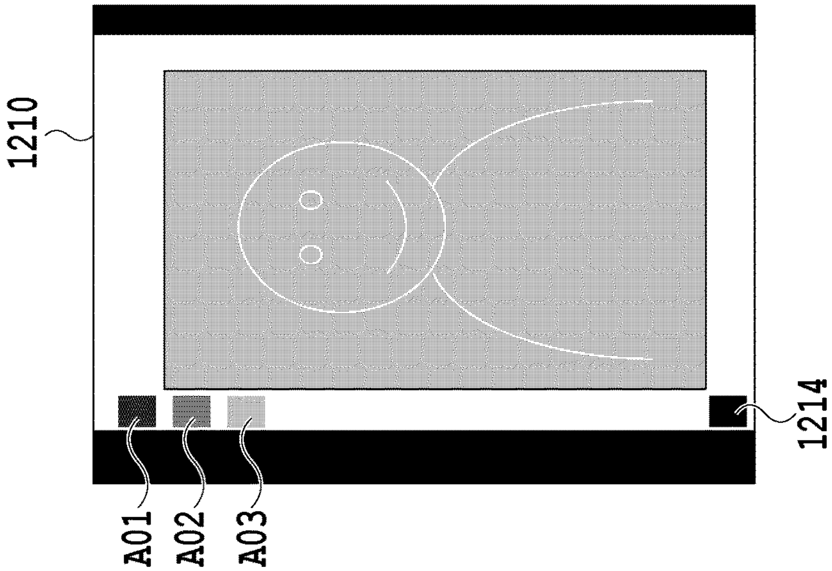

FIG. 12A is a diagram illustrating a scanned image (inspection target image 1201) of an inspection target page other than the start page, and FIG. 12B is a diagram illustrating a scanned image (preceding image 1204) of the preceding page of the inspection target page. FIG. 12C is a diagram illustrating a scanned image of the start page of a printing job.

As illustrated in FIGS. 12A and 12B, reference position markers 1202 and 1205 are printed at end of each inspection target page other than the start page. On the start page, as illustrated in FIG. 12C, markers A01, A02, and A03 for discharge position error correction of colors discharged from the print head 402 are printed at start of the page, and a reference position marker 1214 that is the same as on the other pages is printed at end thereof.

(Operation of Image Processing Apparatus 100)

Figure 6:
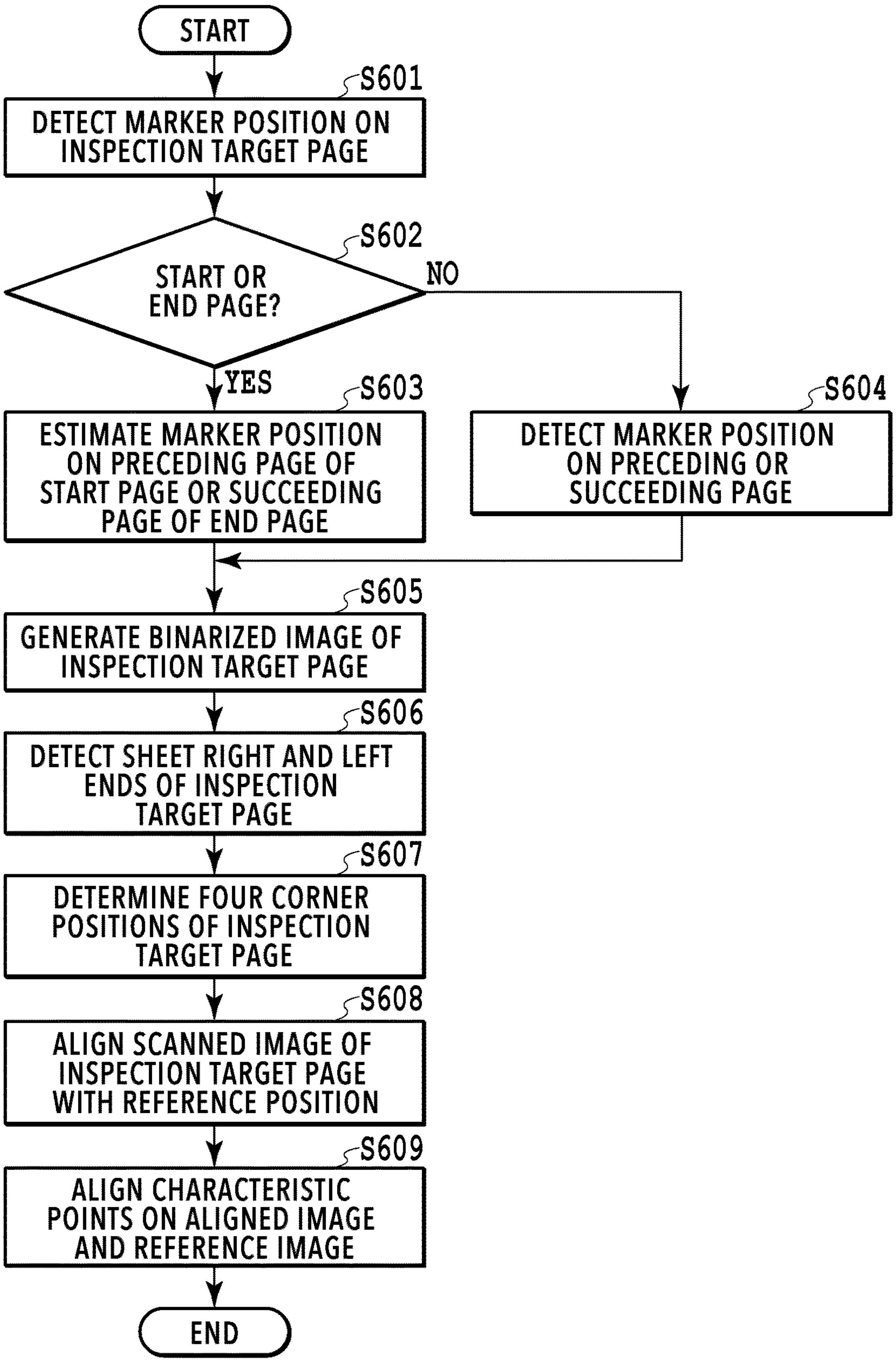
FIG. 6 is a flowchart illustrating the process of aligned image generation processing.

The process of the image processing in the present modification has the same content as in the above description with reference to FIGS. 3 and 6 in the first embodiment except for S301, S302, and S304. The image processing in the present modification 1 will be described below with reference to FIGS. 12A to 12C.

At S301, the CPU 101 (scanned image obtaining unit 201) obtains a scanned image (inspection target image) of an inspection target page, which is stored in the RAM 102 or the main storage device 104. In the present modification, the inspection target image 1201 illustrated in FIG. 12A is obtained at S301. Since one reference position marker 1202 is printed at end of each page, the inspection target image 1201 as the scanned image includes the reference position marker 1202 at end of the page.

Note that, for example, the inspection target image 1201 illustrated in FIG. 12A is expanded in the longitudinal direction due to the desynchronization between the speed of scanning the printed material with the scanner 105 and the speed of roll sheet conveyance by the printing apparatus 190. Furthermore, the position of the roll sheet in the inspection target image 1201 is shifted in the right direction due to positional shift in the roll sheet width direction at roll sheet conveyance. These image expansion and shift are expansion and shift with respect to the reference image 501.

In addition, a point defect 1203 is included in the inspection target image 1201. The defect 1203 is, for example, a droplet of ink dropping from the print head 402 and unintentionally adhering to the printed material.

At S302, the CPU 101 (scanned image obtaining unit 201) obtains a scanned image of the preceding page of the inspection target page, which is stored in the RAM 102 or the main storage device 104. In the present modification, since one reference position marker is printed end of each page, the CPU 101 obtains the preceding image 1204 as illustrated in FIG. 12B. Similarly to the inspection target image 1201, the preceding image 1204 is scanned as an image expanded and contracted in the longitudinal direction due to the desynchronization between the scanning speed and the roll sheet conveyance speed. Furthermore, the position of the roll sheet in the preceding image is shifted in the right direction due to positional shift in the roll sheet width direction at roll sheet conveyance.

Reference image inputting processing at S303 is the same as in the first embodiment.

At S304, the CPU 101 generates an aligned image by aligning the scanned image (inspection target image 1201) of the inspection target page with the reference position based on the detected positions of the reference position markers 1202 and 1205 on the scanned images of the inspection target page and the preceding page.

The procedure of the aligned image generation processing is the same as the procedure of the processing illustrated in FIG. 6. In the present modification, since one reference position marker is printed at end of each page, an image aligned with the reference position is generated for each inspection target page except for the start page by using the reference position markers 1202 and 1205 on scanned image data of the inspection target page and the preceding page. The inspection target image for the start page is aligned with the reference position by using, for example, the marker A01 at the uppermost end among the markers A01 to A03 for other usage printed at start and the reference position marker 1214 printed at end.

The start page will be described below. The CPU 101 performs the edge detection processing on a scanned image (inspection target image) 1210 of the start page and detects, as representative positions, a pixel at, for example, an upper-left edge part of the marker A01 for discharge position error correction at start, and a pixel at, for example, a lower-left edge part of the reference position marker 1214 at end. The CPU 101 binarizes the scanned image 1210 of the start page and detects the right and left ends of the sheet. Thereafter, the CPU 101 determines the positions of the four corners of the scanned image 1210 of the start page based on the detected representative positions of the marker A01 and 1214 and the detected right and left ends of the sheet.

The CPU 101 aligns the scanned image 1210 of the start page with a reference position based on the determined positions of the four corners of the inspection target page. The reference position is calculated from the document data and printing job information of the printed material and scanning timing. Further, the CPU 101 generates an aligned image by aligning characteristic points on the aligned scanned image 1210 and the reference image.

Through the above-described image processing, a scanned image can be highly accurately aligned with a reference position in a case when one reference position marker for alignment is printed at end of each page. In a case when a marker of other usage than a reference position marker on a print image is printed at start of the start page of a printing job, the marker for other usage and the reference position marker at page end can be used for alignment so that all pages including the start page can be highly accurately aligned.

Second Embodiment

In the first embodiment, a description is made of the method of aligning a scanned image of an inspection target page with a reference position by using one reference position marker printed at start or end of each page. However, part of the reference position marker potentially protrudes out of the scanned image due to the desynchronization between the scanning speed of the scanner 105 and the speed of roll sheet conveyance by the printing apparatus 190 or scanning timing difference (difference of the start time of scanning from a designed value). As a result, the accuracy of detecting the reference position marker decreases in some cases.

Thus, in a second embodiment, a reference position marker having a characteristic end part shape is used. In a case when the reference position marker protrudes out of a scanned image of an inspection target page, the image processing apparatus 100 determine a representative position of the reference position marker by using part of the reference position marker, that is, a non-protruding part of the reference position marker.

Figure 13B:
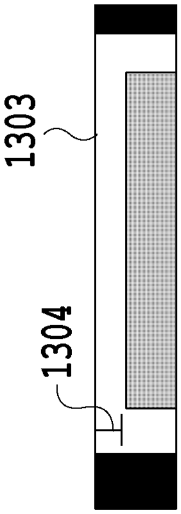
FIGS. 13A and 13B are diagrams illustrating exemplary scanned image data in a second embodiment.
Figure 13A:
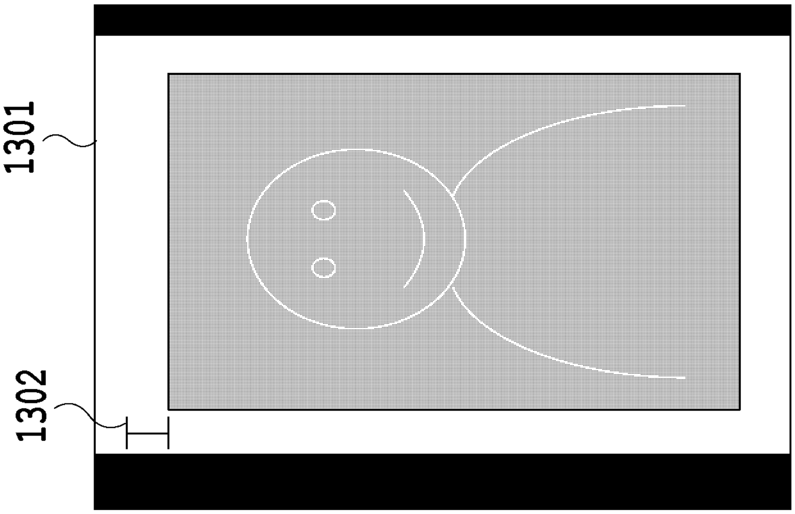

FIG. 13A is a diagram illustrating a scanned image (inspection target image) 1301 of an inspection target page obtained in the second embodiment. In the present embodiment, an image expanded in the longitudinal direction of the image is scanned due to the desynchronization between the scanning speed of the scanner 105 in scanning of the printed material with the scanner 105 and the speed of roll sheet conveyance by the printing apparatus 190. Furthermore, the roll sheet in the inspection target image 1301 is shifted in the right direction due to positional shift in the roll sheet width direction at roll sheet conveyance.

Note that, in the second embodiment, one reference position marker is printed at start of each page and the inspection target image 1301 entirely includes a reference position marker 1302 on the inspection target page.

FIG. 13B illustrates a scanned image (succeeding image) 1303 of the succeeding page obtains in the second embodiment. For example, an image expanded in the longitudinal direction of the image is scanned due to the desynchronization between the scanning speed of the scanner 105 in scanning of the printed material with the scanner 105 and the speed of roll sheet conveyance by the printing apparatus 190. Furthermore, the roll sheet in the succeeding image is shifted in the right direction due to positional shift in the roll sheet width direction at roll sheet conveyance. In addition, part of a reference position marker 1304 on the succeeding page protrudes out of the succeeding image 1303 due to scanning timing difference in scanning of the printed material on the succeeding page.

(Operation of Aligned Image Generating Unit 203)

The process of the aligned image generation processing in the second embodiment will be described below.

Figure 14:
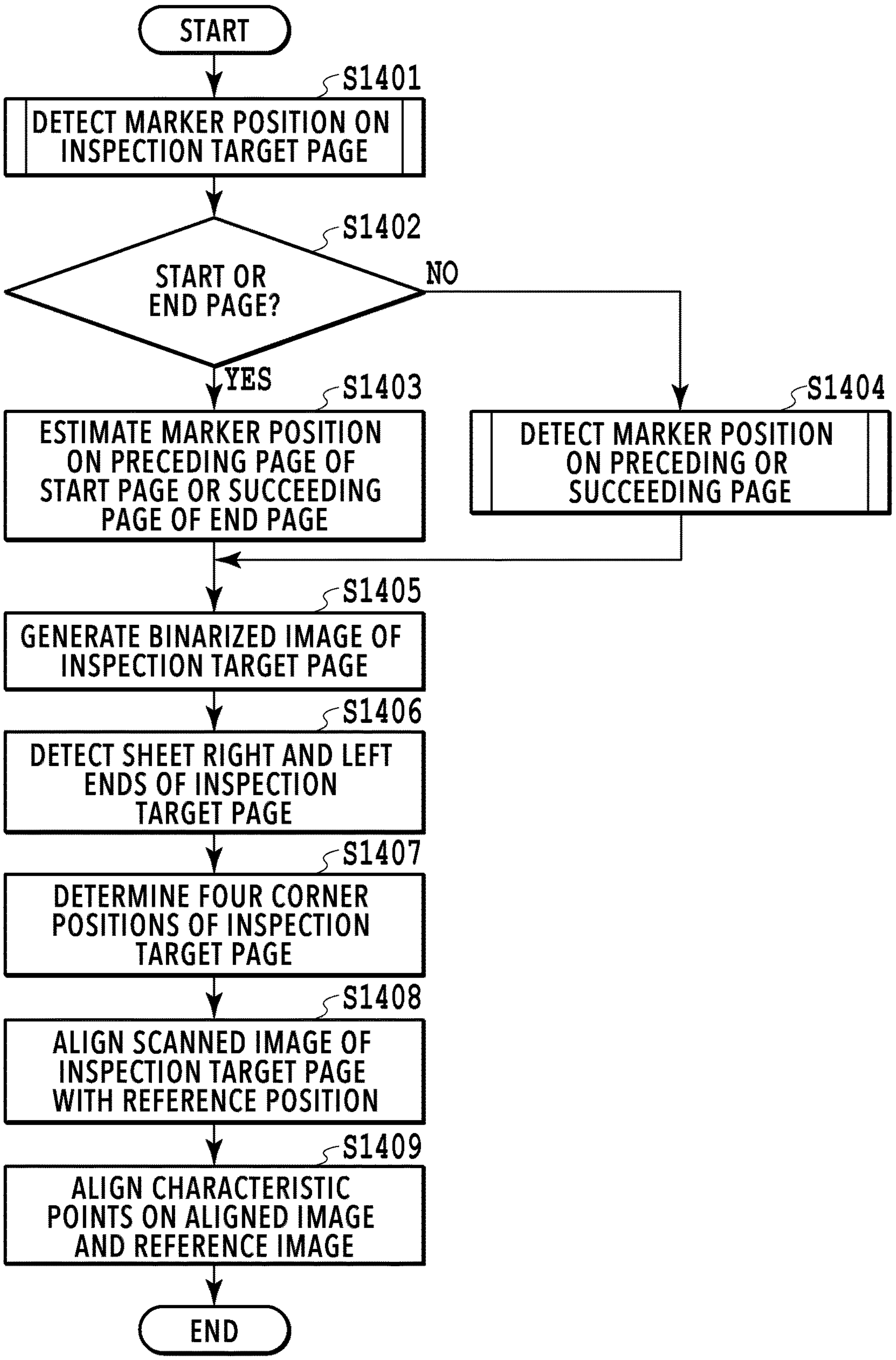
FIG. 14 is a flowchart illustrating the process of aligned image generation processing of the second embodiment.

FIG. 14 is a flowchart illustrating the process of the aligned image generation processing in the second embodiment. The processing in FIG. 14 is the same as in the first embodiment (FIG. 6) except for S1401 and S1404. Specifically, S1402 and S1403 are the same as S602 and S603 in FIG. 6, and S1405 to S1409 are the same as S605 to S609 in FIG. 6.

At S1401, the CPU 101 detects a marker position on the inspection target page. At S1401, the CPU 101 determines whether the reference position marker 1302 on the inspection target image 1301 protrudes out of the inspection target image 1301. In a case when the reference position marker 1302 protrudes, a representative position of the reference position marker is estimated based on a partial region of the reference position marker 1302. In a case when the reference position marker 1302 does not protrude, a representative position of the reference position marker is determining based on the entire reference position marker. Details of marker position detection processing will be described later with reference to FIG. 15.

At S1402, similarly to S601, the CPU 101 determines whether the inspection target image 407 is the start page or end page of printing. In a case when the reference position marker is printed at start of each page and it is determined that the inspection target image is the end page at S1402, the CPU 101 determines that no reference position marker is printed on the succeeding page, and proceeds to S1403. In a case when the inspection target page is not the end page, the CPU 101 determines that the reference position marker is printed on the succeeding page, and proceeds to S1404.

Note that, in a case when the reference position marker is printed at end of each page, the CPU 101 determines whether the inspection target page is the start page at S1402, and proceeds to S1403 in a case when the inspection target page is the start page.

At S1403, similarly to S603, the CPU 101 estimates a marker position on the preceding page of the start page or the succeeding page of the end page. In the present embodiment, no reference position marker is printed on the succeeding page of the end page. Thus, the pixel position of the reference position marker on the succeeding page is estimated based on the pixel position of the reference position marker 407 of the inspection target image 406 detected at S1401. The CPU 101 stores the estimated position of the reference position marker on the succeeding page in a predetermined storage region (for example, the RAM 102).

At S1404, the CPU 101 detects a marker position on the preceding or succeeding page. At S1404, the CPU 101 determines whether the reference position marker 1304 on a scanned image of the preceding or succeeding page protrudes out of the scanned image. In the second embodiment, since the reference position marker is printed at start of each page, it is determined whether the reference position marker 1304 on the scanned image (succeeding image) 1303 of the succeeding page protrudes out of the succeeding image 1303.

In a case when the reference position marker 1304 protrudes, the position of the reference position marker is estimated based on a partial region of the reference position marker. In a case when the reference position marker 1304 does not protrude, a representative position of the reference position marker is determined based on the entire reference position marker 1304. Details of the marker position detection processing will be described later with reference to FIG. 15.

the representative position of the reference position marker detected at S1401 and S1404 is stored in a predetermined storage region.

(Operation of Marker Position Detection Processing by Aligned Image Generating Unit 203)

Details of the marker position detection processing at S1401 and S1404 will be described below.

Figure 15:
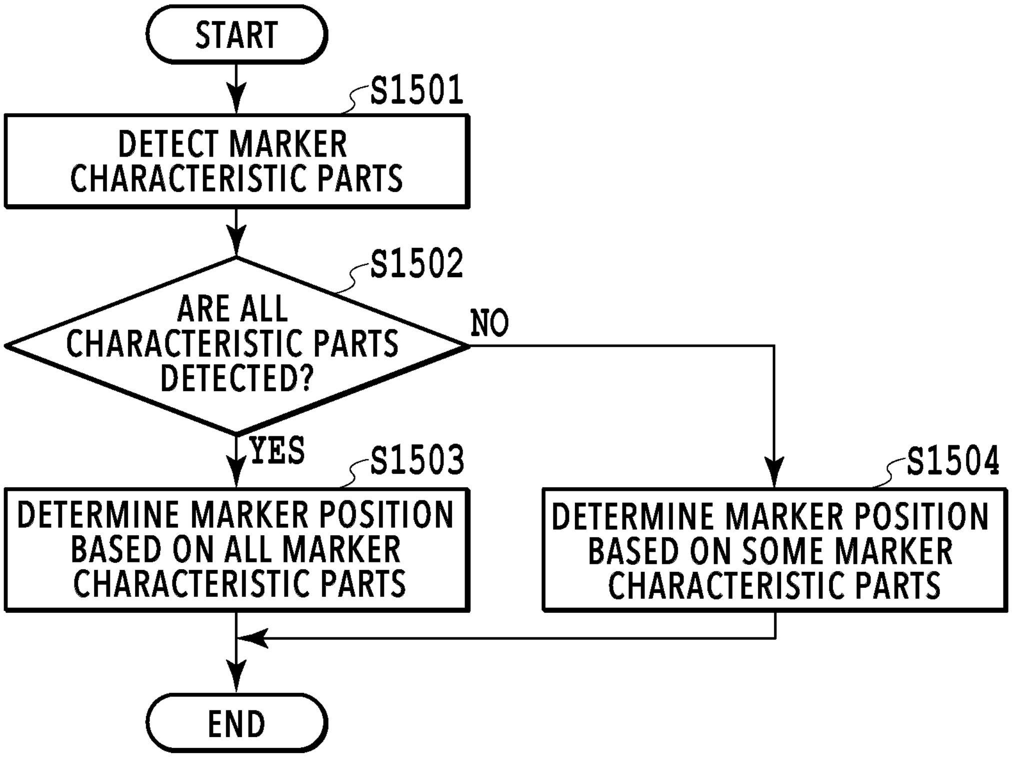
FIG. 15 is a flowchart illustrating the process of marker position detection processing of the second embodiment.

FIG. 15 is a flowchart illustrating the process of the marker position detection processing executed at S1401 and S1404.

At S1501, the CPU 101 (aligned image generating unit 203) detects a characteristic part (marker characteristic part) of the reference position marker from a scanned image (the inspection target image 1301 or the succeeding image 1303). The marker characteristic part is, for example, an end point of the reference position marker or the intersection point of lines constituting the reference position marker. The CPU 101 detects an edge part pixel from the reference position marker 1302 by performing edge detection processing such as Sobel filter processing or Harris corner detection processing on the target image 1301 and sets the detected edge part pixel as the marker characteristic part.

Figures 16A, 16B, 16C:
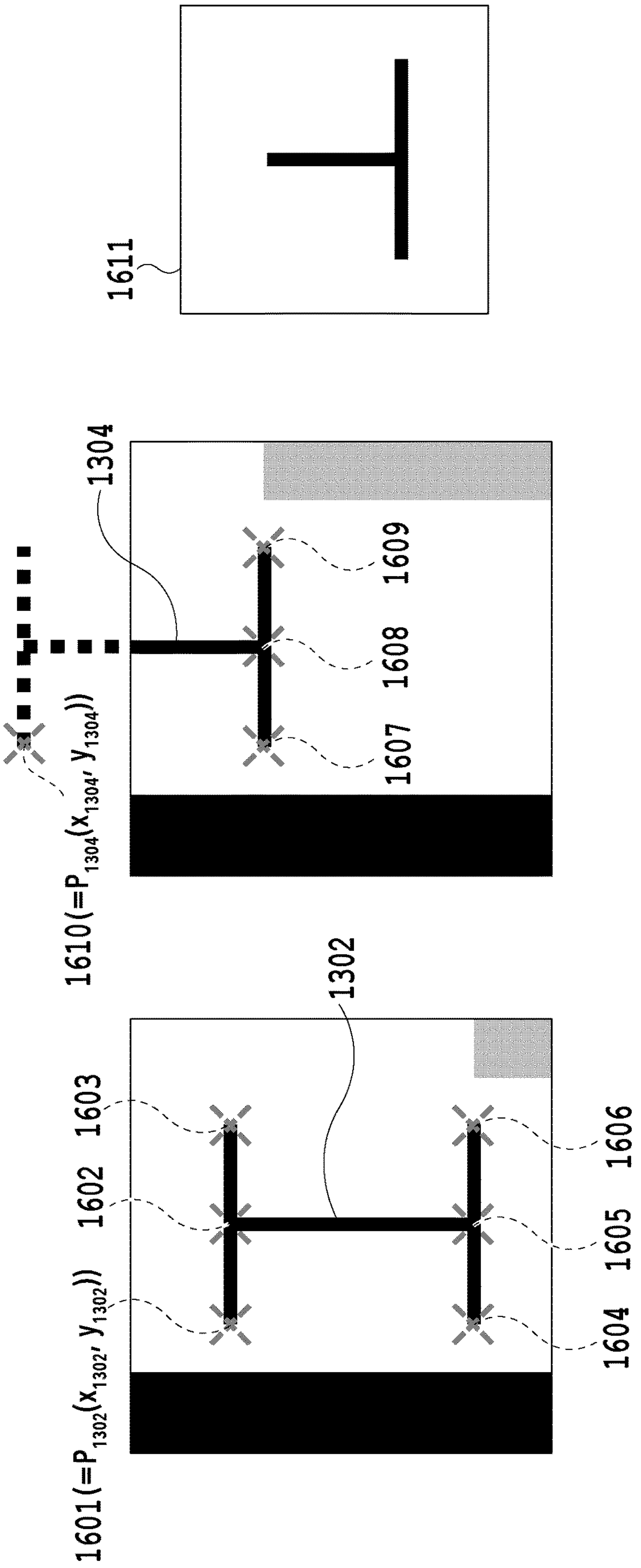
FIGS. 16A to 16C are diagrams illustrating an exemplary reference position marker of the second embodiment.

FIG. 16A is a diagram illustrating an enlarged view of the vicinity of the reference position marker 1302. The reference position marker 1302 illustrated in this example is formed with two horizontal lines parallel to each other and one vertical line connecting the middle points of the horizontal lines. With such a shape, for example, end points of each line segment and the intersection point of the vertical line and each horizontal line are detected as edge parts. Moreover, the shape of the reference position marker 1302 is vertically symmetric as a whole to sense protrusion in the conveyance direction of the roll sheet. Points 1601 to 1606 in FIG. 16A are edge part pixels each detected as the marker characteristic part.

In the present embodiment, whether all marker characteristic parts are detected is determined by comparing the number of detected edge parts with a predetermined threshold value. For example, the number of marker characteristic parts (edge parts) is six for the reference position marker 1302 in the shape illustrated in FIG. 16A, and thus the predetermined threshold value is "6". Accordingly, it is determined that no protrusion exists in a case when all six marker characteristic parts are detected, and it is determined that protrusion exists in a case when the number of detected edge parts is smaller than six.

Similarly, the CPU 101 detects any marker characteristic part from the succeeding image 1303 illustrated in FIG. 13B.

FIG. 16B is an enlarged view of the vicinity of the reference position marker 1304 on the succeeding image 1303. End points 1607 and 1609 of a horizontal line of the reference position marker 1304 and the intersection point 1608 of the vertical line and the horizontal line are detected as edge parts. Accordingly, the number of marker characteristic parts detected from the succeeding image 1303 is three.

At S1502, the CPU 101 determines whether all marker characteristic parts are detected by comparing the number of marker characteristic parts detected from the reference position marker on the scanned image with a threshold value set in advance. In the present embodiment, as described above, the threshold value is set to six. Specifically, in a case when the number of edges of the reference position marker detected from the scanned image is six, the CPU 101 determines that the reference position marker does not protrude, and proceeds to S1503. In a case when the number of edges of the reference position marker detected from the scanned image is smaller than six, the CPU 101 determines that the reference position marker protrudes, and proceeds to S1504.

At S1503, the CPU 101 determines the position of the reference position marker by using all marker characteristic parts detected at S1501. In the example illustrated in FIG. 16A, the entire reference position marker 1302 is included in the target image 1301, and the edge parts 1601 to 1606 are detected as marker characteristic parts. In the present embodiment, the pixel position of the upper-left point 1601 among the detected marker characteristic parts is determined as a representative position $P_{1302}$ ($x_{1302}$, $y_{1302}$) of the reference position marker 1302.

At S1504, the CPU 101 estimates the position of the reference position marker by using some of the detected marker characteristic parts. In the example illustrated in FIG. 16B, the reference position marker 1304 protrudes out of the succeeding image 1303, and only three edge parts 1607, 1608, and 1609 are detected as marker characteristic parts. In this case, the CPU 101 determines a representative position $P_{1304}$ ($x_{1304}$, $y_{1304}$) of the reference position marker 1304 on the succeeding page by using some of the marker characteristic parts detected at S1501.

Specifically, the CPU 101 performs template matching processing on the succeeding image 1303 by using a template image 1611 of the lower part of the reference position marker, which is illustrated in FIG. 16C. The CPU 101 calculates a left end point position 1610 of the upper horizontal line of the reference position marker 1304 based on a matching position of the template image 1611 and a print size of the reference position marker, which is calculated from the document data of the printed material. The calculated end point 1610 is determined as the representative position $P_{1304}$ ($x_{1304}$, $y_{1304}$) of the reference position marker 1304 on the succeeding page.

After the representative position of the reference position marker is determined through the processing at $1503 and S1504, the processing of the present flowchart is ended.

By performing the processing of the flowchart in FIG. 15 by using a reference position marker having characteristic end parts, it is possible to determine the reference position of the reference position marker based on the position of a non-protruding part of the reference position marker even in a case when the reference position marker protrudes out of scanned image data.

Note that, although the example in which the reference position marker is printed at start of each page and an upper part of the reference position marker protrudes is described above, the present embodiment is also applicable to a case when a lower part of the reference position marker protrudes.

Specifically, the CPU 101 performs the template matching processing by using a template image corresponding to a non-protruding marker characteristic part and detects a position of matching with the template image. Then, the representative position of the reference position marker is determined based on the position of matching with the template image and the print size of the reference position marker, which is calculated from the document data of the printed material. In a case where one reference position marker is printed at end of each page, the pixel position of the lower-left edge of the reference position marker on scanned image data of the inspection target page and the preceding page is determined as the representative position of the reference position marker.

The subsequent processing (S1405 to S1409) is the same as in the first embodiment (S605 to S609).

Accordingly, the image processing apparatus 100 can highly accurately align the inspection target image with the reference position. In particular, even in a case when one reference position marker printed at page start or end protrudes out of a scanned image due to the desynchronization between the scanning speed of the scanner 105 and the roll sheet conveyance speed, the representative position of the marker is estimated from a partial region of the reference position marker. Accordingly, the inspection target image can be highly accurately aligned with the reference position.

Note that the shape of the reference position marker only needs to be a shape with which protrusion in the up-down direction (sheet conveyance direction) can be determined. Thus, the reference position marker may have a vertically characteristic shape such as an edge and is not limited to the shape of the reference position marker 1302 in FIG. 16A. Moreover, in the above-described example, whether the reference position marker protrudes is determined based on the number of detected edge parts (marker characteristic parts), but the determination is not limited to the number of edges. For example, a protrusion may be determined by performing template matching using a template image including the entire shape of the reference position marker.

Third Embodiment

In the first and second embodiments, a description is made of the method of aligning a scanned image of an inspection target page with a reference position by detecting the position of one reference position marker printed at start or end of each page. However, for example, in the printing apparatus 190 of an ink jet scheme, image degradation such as bleeding occurs to the reference position marker on a particular page due to an unexpected discharge defect of a print head, and detection of the reference position marker fails in some cases.

In a third embodiment, a description will be made of a method by which, even in a case when detection of the reference position marker fails, a scanned image is highly accurately aligned with a reference position based on the position of the reference position marker on each of the preceding and succeeding pages of an anomaly page on which detection fails.

Figure 17:
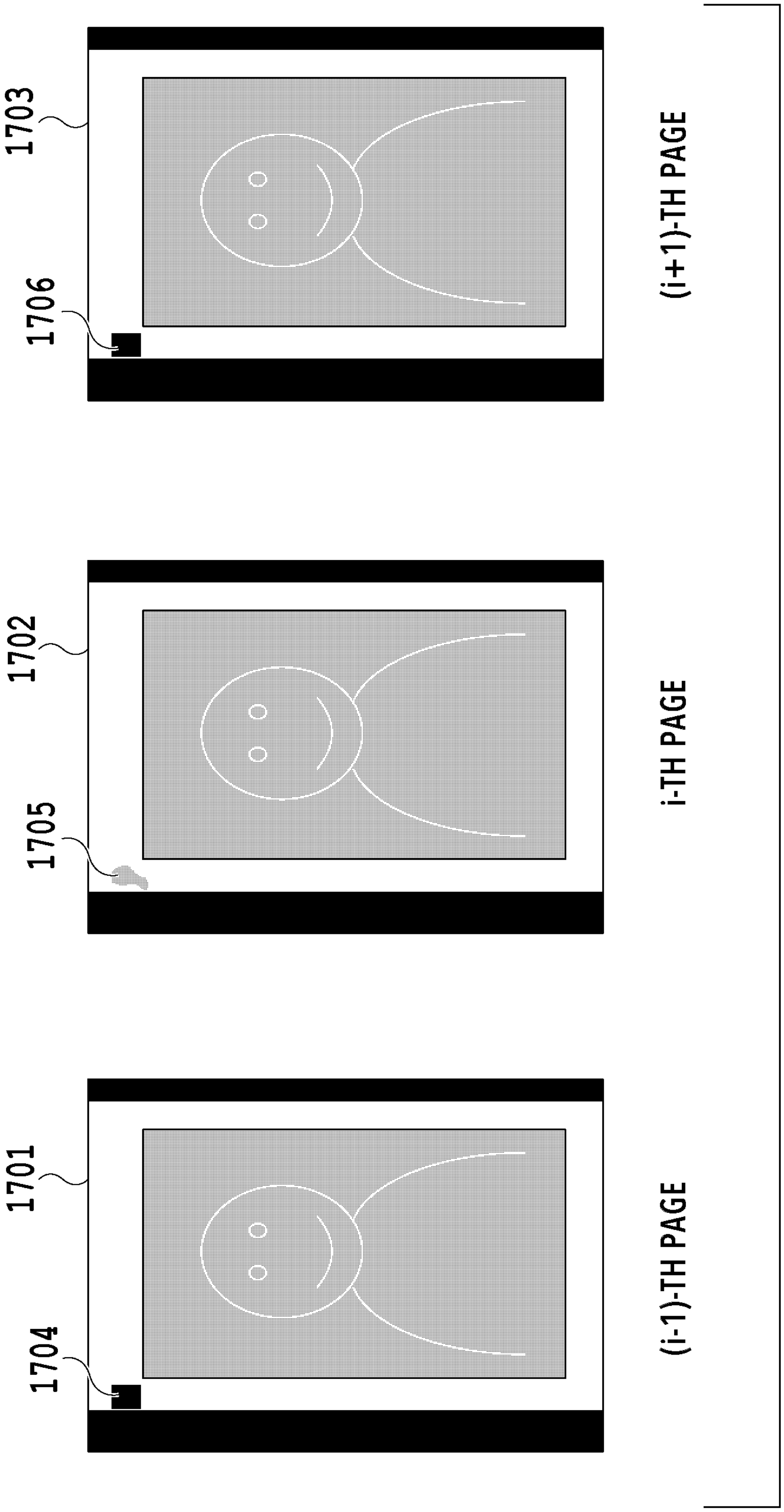
FIG. 17 is a diagram illustrating exemplary scanned image data of a third embodiment.

FIG. 17 illustrates scanned images 1701, 1702, and 1703 of an (i−1)-th page, an i-th page, and an (i+1)-th page. In the present embodiment, a description will be made of a case when the image processing (FIG. 3) described above in the first or second embodiment is executed on the scanned image of each page in order from the start page and the aligned image generation processing is executed on the scanned image of the i-th page.

As illustrated in FIG. 17, in the present embodiment, an image expanded in the longitudinal direction of the image as compared to the reference image 501 illustrated in FIG. 5A is scanned due to the desynchronization between the speed of scanning the printed material with the scanner 105 and the speed of roll sheet conveyance by the printing apparatus 190. Furthermore, the roll sheet in each scanned image is shifted in the right direction as compared to the reference image 501 due to positional shift in the roll sheet width direction at roll sheet conveyance.

One reference position marker is printed at start of each page, and reference position markers 1704 to 1706 are included in the respective scanned images 1701 to 1703 of the (i−1) to (i+1)-th pages. Furthermore, a reference position marker 1705 on the i-th page bleeds due to an unexpected discharge defect of the print head 402 at printing of an inspection target page.

(Operation of Aligned Image Generating Unit 203)

Figure 18:
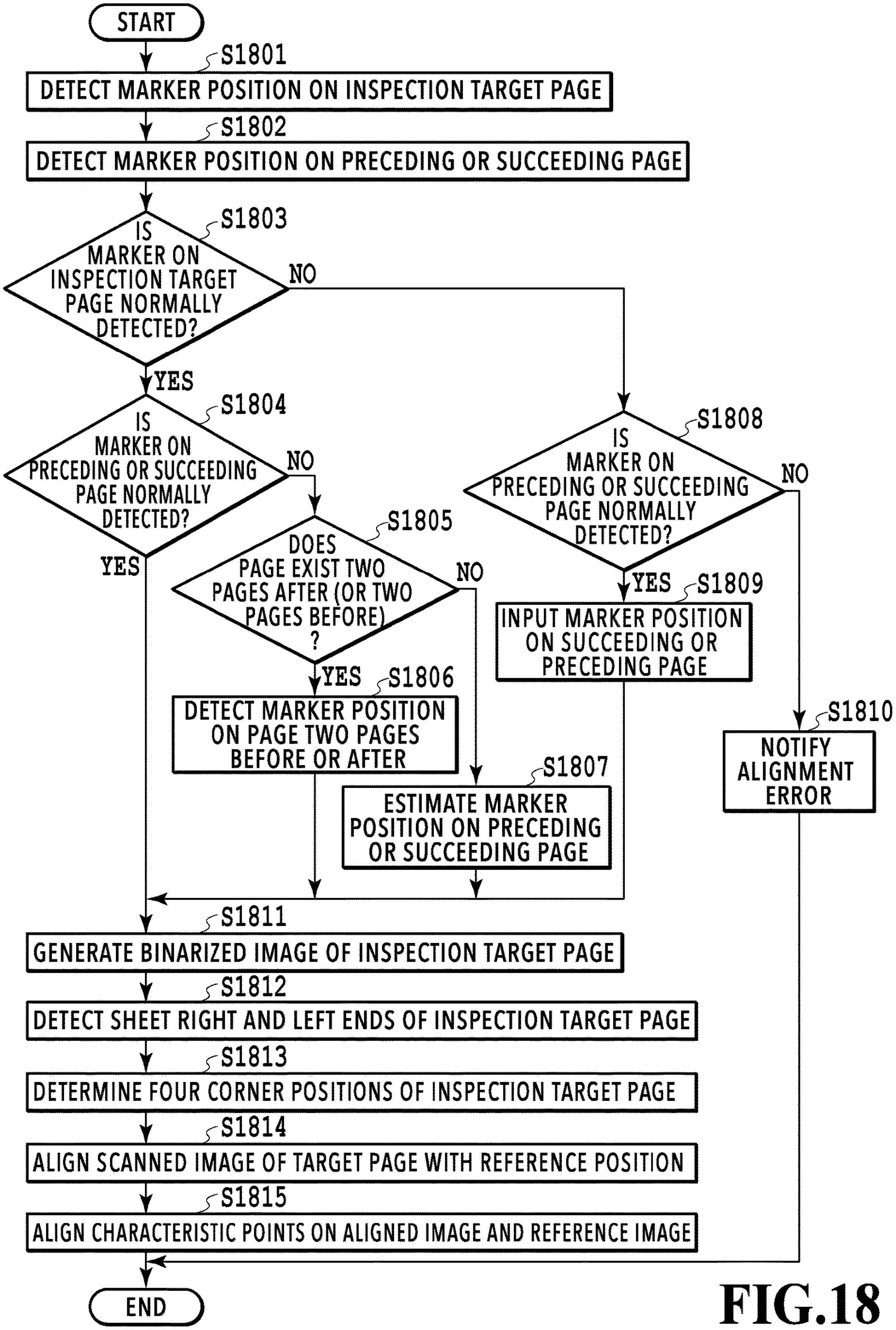
FIG. 18 is a flowchart illustrating the process of aligned image generation processing of the third embodiment.

FIG. 18 is a flowchart illustrating the process of the aligned image generation processing in the third embodiment. The flowchart in FIG. 18 except for S1801 to S1807 is the same as for the aligned image generation processing illustrated in FIG. 6 in the first embodiment. The following description will be mainly made of difference from the flowchart in FIG. 6.

At S1801, similarly to S601, the CPU 101 detects the pixel position (representative position) of a reference position marker on the inspection target image.

At S1802, similarly to S604, the CPU 101 detects the pixel position (representative position) of a reference position marker on the preceding or succeeding page.

In the present embodiment, the position of a pixel at the upper-left edge part among pixels at edge parts of each detected reference position marker is set as the representative position of the reference position marker. The representative positions of the reference position markers on the respective pages, which are detected at S1801 and S1802 are stored in a predetermined storage region (for example, the RAM 102).

Subsequently, at S1803, the CPU 101 determines whether the reference position marker on the inspection target page is normally detected. In a case when the detected position of the reference position marker on the target image, which is detected at S1801, is stored in the predetermined storage region (for example, the RAM 102), the CPU 101 determines that the reference position marker is normally detected (YES at S1803), and proceeds to S1804. In a case when no detected position of the reference position marker is stored in the predetermined storage region (for example, the RAM 102), the CPU 101 determines that the inspection target page is an anomaly page on which detection of the reference position marker fails (NO at S1803), and proceeds to S1808.

For example, in a case when the inspection target page is the (i−1)-th page illustrated in FIG. 17, the CPU 101 determines that the reference position marker 1704 on the inspection target image 1701 is normally detected, and proceeds to S1804. In a case when the inspection target page is the i-th page, the CPU 101 determines that position detection of the reference position marker 1705 bleeding on the target image 1702 fails and the inspection target page is an anomaly page, and then proceeds to S1808.

At S1804, the CPU 101 determines whether the reference position marker on the preceding or succeeding page is normally detected. In the present embodiment, since the reference position marker is printed at page start, the determination is made on the succeeding page.

The CPU 101 determines whether the detected position of the reference position marker on the scanned image of the succeeding page, which is detected at S1802, is stored in the predetermined storage region (for example, the RAM 102), thereby determining whether the reference position marker is normally detected. In a case when the detected position of the reference position marker is stored in the predetermined storage region, the CPU 101 determines that the reference position marker on the succeeding page is normally detected, and proceeds to S1811. In a case when no detected position of the reference position marker is stored in the predetermined storage region, the CPU 101 determines that the succeeding page is an anomaly page on which detection of the reference position marker fails, and proceeds to S1805.

For example, in a case when the inspection target page is the (i−1)-th page, position detection of the reference position marker 1705 bleeding on the scanned image data 1702 of the succeeding page (i-th page) fails. Thus, the CPU 101 determines that the succeeding page is an anomaly page on which position detection of the reference position marker fails, and proceeds to S1805.

At S1805, the CPU 101 determines whether a page exists two pages after (or two pages before) the inspection target page. In a case when the reference position marker is printed at start of each page, the inspection target page is aligned with the reference image by using the reference position markers on the inspection target page and the succeeding page. In a case when it is determined at S1804 that the reference position marker on the succeeding page is anomalous, it is determined whether its succeeding page, in other words, a page two pages after the inspection target page exists.

Similarly, in a case when the reference position marker is printed at end of each page, the inspection target page is aligned with the reference image by using the reference position markers on the inspection target page and the preceding page. In a case when it is determined at S1804 that the reference position marker on the preceding page is anomalous, it is determined whether its preceding page, in other words, a page two pages before the inspection target page exists.

The CPU 101 proceeds to S1806 in a case when a page exists two pages after (or two pages before) the inspection target page, or the CPU 101 proceeds to S1807 in a case when no page exists two pages after (or two pages before) the inspection target page. Note that the case when no page exists two pages after (or two pages before) the inspection target page is that the inspection target page is the preceding page (or the succeeding page of the start page) of the end page.

At S1806, the CPU 101 detects the position of the reference position marker on the page two pages after (or two pages before) the inspection target page. The CPU 101 stores the detected pixel position of the reference position marker in the predetermined storage region (for example, the RAM 102). For example, in a case when the inspection target page is the (i−1)-th page, the CPU 101 detects the pixel position of the reference position marker 1706 on the scanned image 1703 of the (i+1)-th page two pages after.

Detection of the pixel position of the reference position marker is the same as the above-described detection processing. Specifically, the CPU 101 determines, as the representative position of the reference position marker, the position of a pixel at the upper-left edge among pixels at edge parts of the reference position marker 1706 detected from the scanned image 1703 of the (i+1)-th page.

At S1807, the CPU 101 estimates a marker position on the succeeding page (or the preceding page) of the inspection target page. The marker position estimation may be performed in the same manner as at S603. Specifically, the CPU 101 calculates the relative distance between the reference position markers on pages, which is calculated from the document data and printing job information of the printed material. The pixel position of the reference position marker 410 on the succeeding page can be estimated by adding the calculated relative distance to the pixel position of the reference position marker on the inspection target page, which is detected at S1801. Note that this estimation method is exemplary and the present invention is not limited to the method.

At S1808, the CPU 101 determines whether the reference position marker on the preceding or succeeding page is normally detected. In the present embodiment, since the reference position marker is printed at page start, the determination is made for the succeeding page. The CPU 101 determines whether the reference position marker is normally detected by determining whether the detected position of the reference position marker on the scanned image of the succeeding page, which is detected at S1802 is stored in the predetermined storage region (for example, the RAM 102).

In a case when the detected position of the reference position marker is stored in the predetermined storage region, the CPU 101 determines that the reference position marker on the succeeding page is normally detected, and proceeds to S1809. In a case when no detected position of the reference position marker is stored in the predetermined storage region, the CPU 101 determines that the succeeding page is an anomaly page on which detection of the reference position marker fails, and proceeds to S1810.

At S1809, the CPU 101 obtains the representative position of the reference position marker on the scanned image of the preceding page of the inspection target page, which is stored in the predetermined storage region at aligned image generation for the preceding page. In the present embodiment, in a case when the inspection target page is the i-th page, the representative position of the reference position marker 1704, which is stored in the predetermined storage region (for example, the RAM 102) at aligned image generation for the scanned image 1701 of the (i−1)-th page is input.

Note that the determination at S1808 is made for the preceding page in a case when the reference position marker is printed at page end. The CPU 101 determines that the reference position marker on the preceding page is normally detected in a case when the detected position of the reference position marker on the scanned image of the preceding page, which is detected at S1802 is stored in the predetermined storage region (for example, the RAM 102). In this case, the CPU 101 obtains the reference position marker on the preceding page and proceeds to S1809. At S1809, the CPU 101 obtains the representative position of the reference position marker on the scanned image of the succeeding page of the inspection target page.

At S1810, the CPU 101 determines that detection of the reference position marker fails on the inspection target page and the preceding or succeeding page and thus the two continuous pages are anomaly pages, and performs error notification. The CPU 101 notifies error to the printing apparatus 190 or the UI panel 108, and thereafter ends the present flowchart.

In the case of YES at S1804 or after the processing at S1806, S1807, or S1809, the CPU 101 proceeds to processing at S1811 and later. Processing at S1811 to S1815 is the same as the processing at S605 to S609, but calculation of the positions of the four corners is different depending on a page on which the reference position marker is detected (estimated).

The CPU 101 binarizes the inspection target image at S1811 and detects the right and left ends of the sheet in the binarized target image at S1812.

At S1813, the CPU 101 determines the positions of the four corners of the inspection target page.

(1) In a case when the reference position markers on the inspection target page and the succeeding page are both normally detected, the CPU 101 determines the positions of the four corners by using the reference position markers on the inspection target page and the succeeding page as in the first embodiment.

(2) In a case when the reference position marker on the inspection target page is normally detected and the reference position marker on the succeeding page is anomalous, the CPU 101 determines the positions of the four corners of the inspection target page by using the reference position marker on the second succeeding page (two pages after the inspection target page). In other words, the positions of the four corners are determined by using the inspection target page and the reference position marker on the page two pages after the inspection target page.

Thus, in a case when the reference position marker on the inspection target page is normally detected and no reference position marker is detected on the adjacent image, the aligned image generating unit 203 (CPU 101) generates an aligned image based on the reference position marker detected on the inspection target image and the reference position marker detected on another image adjacent to the adjacent image.

(3) In a case when the reference position marker on the inspection target page is normally detected, the reference position marker on the succeeding page is anomalous, and no page exists after the succeeding page (two pages after the inspection target page), the CPU 101 estimates the position of the reference position marker on the succeeding page of the inspection target page and determines the positions of the four corners of the inspection target page. In other words, the positions of the four corners is determined by using the reference position marker on the inspection target page and the estimated position of the reference position marker on the succeeding page.

Thus, in a case when the reference position marker on the inspection target image is normally detected, no reference position marker is detected on the adjacent image, and no other image adjacent to the adjacent image is obtained, the aligned image generating unit 203 (CPU 101) estimates the position of the reference position marker on the adjacent image based on the position of the reference position marker detected on the inspection target image and the relative distance between the reference position markers on inspection unit regions (pages), which is determined based on the document data and the printing job information, and generates an aligned image based on the estimated position of the reference position marker and the position of the reference position marker detected on the inspection target image.

(4) In a case when the reference position marker on the inspection target page is anomalous and the reference position markers on the preceding page and the succeeding page are normally detected, the positions of the four corners of the inspection target page are determined by using the reference position markers on the preceding page and the succeeding page. In other words, in a case when no marker is detected on the inspection target image, the aligned image generating unit 203 (CPU 101) generates an aligned image based on a marker detected on the adjacent image on the front side of the inspection target image in the conveyance direction and a marker detected on the adjacent image on the back side thereof.

(5) In a case when the reference position marker on the inspection target page is anomalous and the reference position marker on the succeeding page is anomalous (in a case when no reference position marker is detected on the inspection target image and the adjacent image), the CPU 101 notifies error.

Note that the above-described (1) to (5) aspects are examples in a case when the reference position marker is printed at start of each page. In a case when the reference position marker is printed at end of each page, the aspects are applicable with the preceding and succeeding pages interchanged.

The CPU 101 generates an aligned image by aligning the positions of the four corners with the reference position on the reference image at S1814, aligns characteristic points on the aligned image and the reference image at S1815, and thereafter executes the inspection processing.

As described above, in a case when detection of the position of the reference position marker fails on a particular page, the CPU 101 performs alignment by using the reference position markers on the preceding and succeeding pages of an anomaly page on which the detection fails. Accordingly, alignment can be performed by using the two markers, and thus a scanned image can be highly accurately aligned with the reference position.

Note that a marker position on an anomaly page may be estimated by interpolation, or the like, based on the detected position of the reference position marker on a page where the reference position marker is normally detected.

Although the scanned image of the inspection target page is aligned by using two reference position markers the positions of which are normally detected in the above-described example, the scanned image of the inspection target page may be aligned by using three or more reference position markers.

Modification of Third Embodiment

In the third embodiment, a description is made of the example in which one reference position marker is printed at the same position on each page (inspection unit region), and even in a case when a reference position marker is anomalous, the scanned image of the inspection target page is aligned with the reference position based on detected positions of the preceding and succeeding markers. As a modification thereof, an example in which the alignment is performed by using a reference position marker printed at a different position on each page in accordance with the size of the page will be described below.

Figure 19:
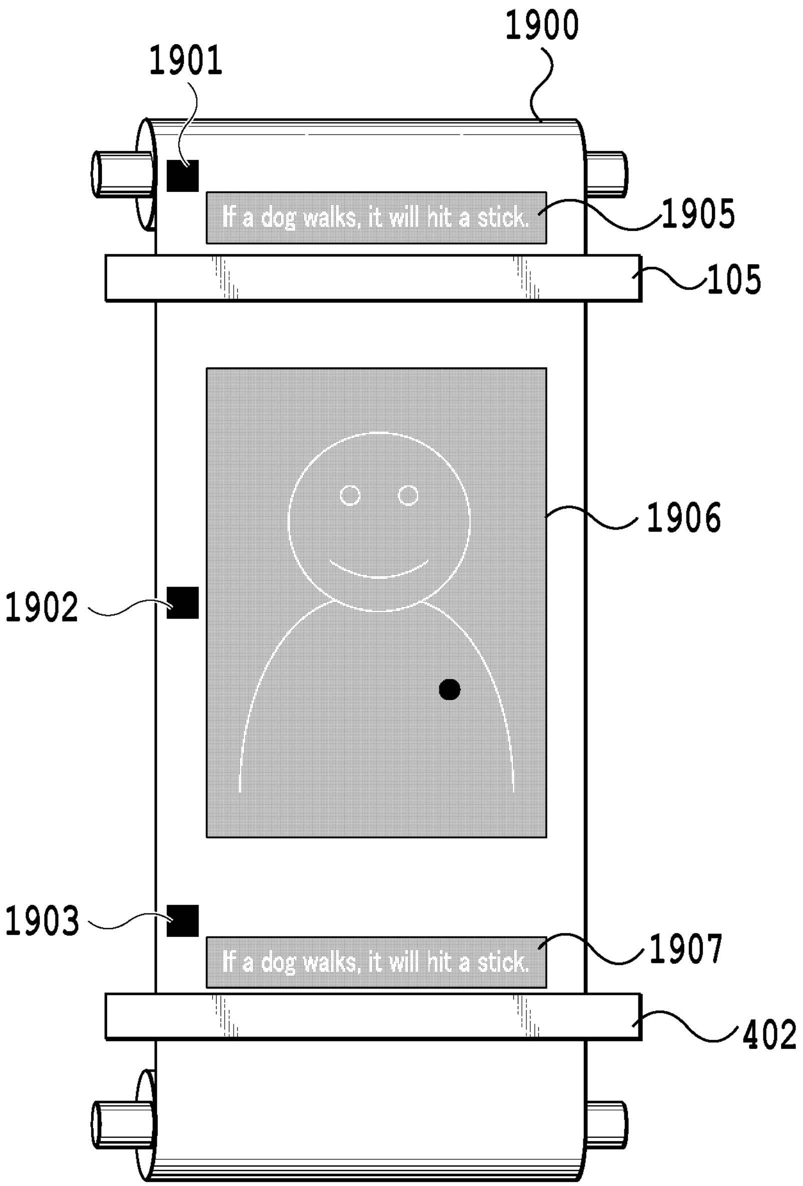
FIG. 19 is a diagram illustrating another exemplary disposition of a reference position marker.

FIG. 19 is a diagram for description of the modification of the third embodiment.

For example, in a case when two kinds of document data with different document sizes are alternately printed, the distance between reference position markers is long or short depending on pages if the reference position markers are printed at the same position (for example, start) on the respective pages. In such a case, the reference position markers may be printed at different positions on the pages as illustrated in FIG. 19.

For example, in a case when pages with short and long lengths in the conveyance direction of the roll sheet are alternately printed, reference position markers 1901 and 1903 are marked at page start on short pages 1905 and 1907 and a reference position marker 1902 is marked at page center on a long page 1906.

In a case when a scanned image of the second page is aligned as the inspection target page, the CPU 101 detects the positions of three of the reference position marker 1902 at page center and the reference position markers 1901 and 1903 on the first and third pages. Then, the scanned image (inspection target image) of the second page is aligned with the reference position by using the three reference position markers.

Specifically, the positions of the four corners of the scanned image of the second page are determined by using the reference position markers 1901 and 1903 on the first and third pages, and the positions of the four corners are aligned with the reference position by additionally using the reference position marker 1902 on the second page. Accordingly, the alignment can be highly accurately performed without imbalance between pages.

Fourth Embodiment

Figure 7:
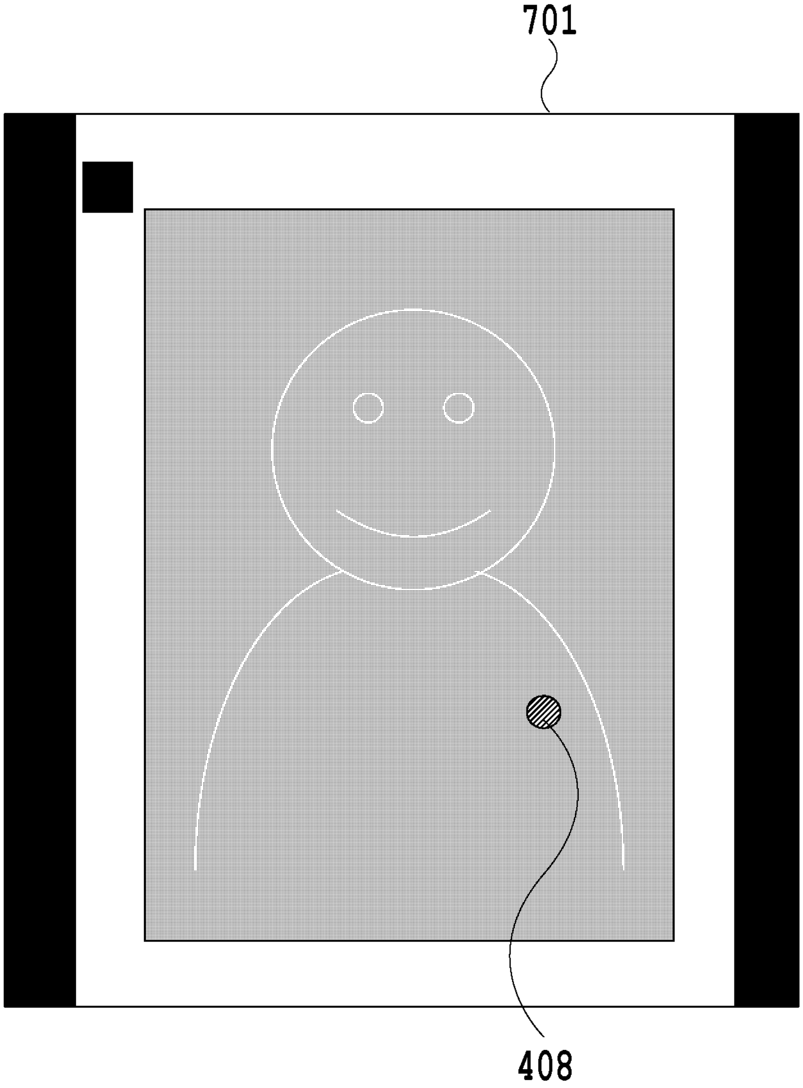
FIG. 7 is a diagram illustrating an exemplary inspection result.

In a case when a defect is detected in the inspection processing, an image 701 illustrating an inspection result is displayed on the UI panel 108 (FIG. 7). In this case, in a normal display aspect in which only the inspection target page is displayed, it has been difficult for the user to check whether the defect is detected due to positional shift caused by error in the detected position of a reference position marker on the preceding or succeeding page.

For example, in a case when the positions of reference position markers on the inspection target page and the succeeding page, which should be detected at the positions of a point $P(x_p, y_p)$ and a point $Q(x_q, y_q)$ are detected at the positions of a point $P'(x_p, y_p+\Delta_y)$ and a point $Q'(x_q, y_q+\Delta_y)$, respectively, shifted by $\Delta y$ in the conveyance direction, an image with positional shift of $-\Delta y$ in the conveyance direction is generated at alignment with the reference position.

Thus, in a fourth embodiment, the detected position of a reference position marker on the preceding or succeeding page is displayed in addition to display of an inspection result so that the user can easily visually recognize error in the detected position of the marker.

(Functional Configuration of Image Processing Apparatus 100)

Figure 20:
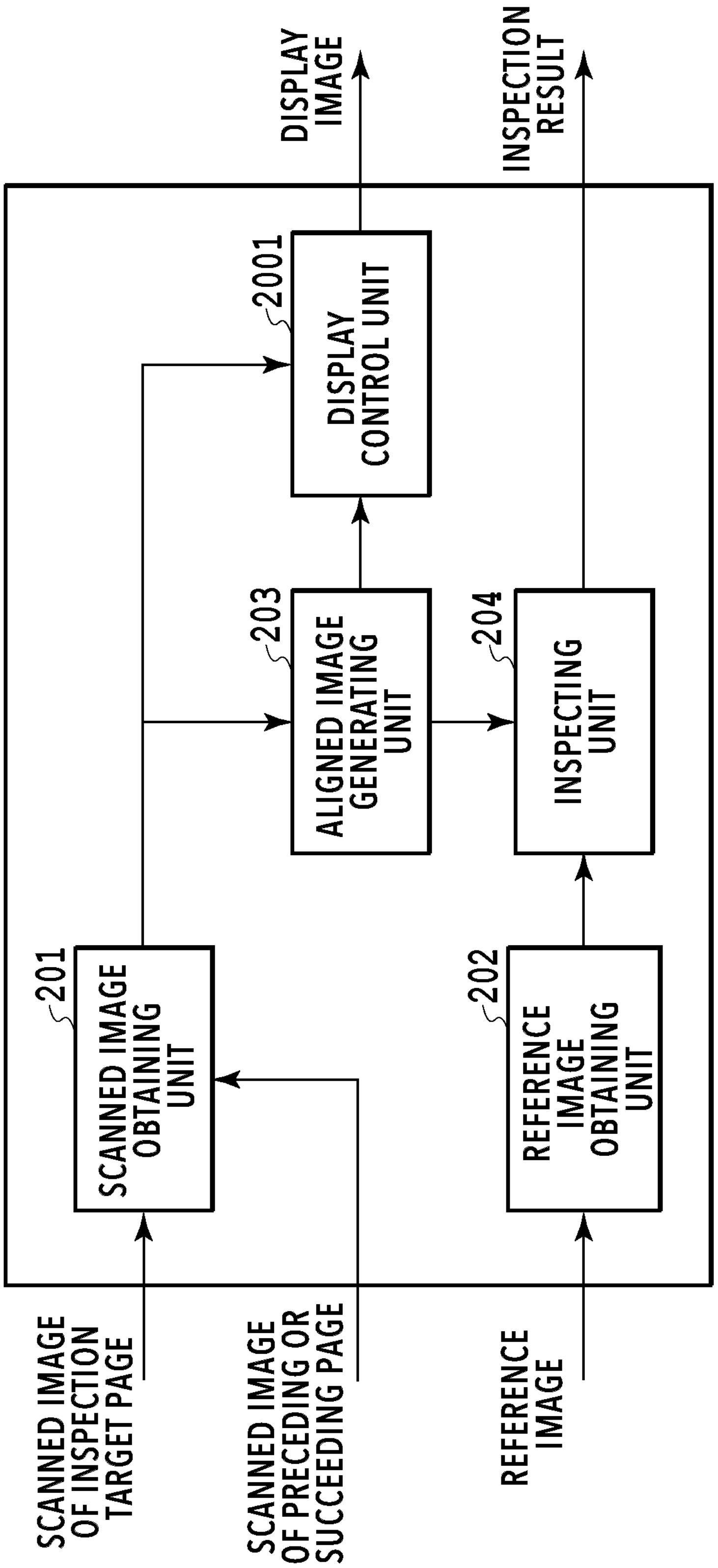
FIG. 20 is a block diagram illustrating a functional configuration of a fourth embodiment.

FIG. 20 is a block diagram illustrating an example of a functional configuration of the image processing apparatus 100 in the fourth embodiment. Note that each component illustrated in FIG. 20 is implemented as a computer program for implementing its function is supplied to the image processing apparatus 100 illustrated in FIG. 1 and executed by the image processing apparatus 100.

As illustrated in FIG. 20, the image processing apparatus 100 in the fourth embodiment includes the scanned image obtaining unit 201, the reference image obtaining unit 202, the aligned image generating unit 203, the inspecting unit 204, and a display control unit 2001. The components other than the display control unit 2001 are the same as the scanned image obtaining unit 201, the reference image obtaining unit 202, the aligned image generating unit 203, and the inspecting unit 204, which are described in the first embodiment, and thus are denoted by the same reference signs and duplicate description thereof is omitted.

The display control unit 2001 generates a display image of the vicinity region of the reference position marker on the preceding or succeeding page based on the representative position of the reference position marker on the preceding or succeeding page, which is detected in a process of generating aligned image and an input scanned image of the preceding or succeeding page. The display control unit 2001 outputs the generated display image to the printing apparatus 190 or displays the generated display image on the UI panel 108.

(Operation of Image Processing Apparatus 100)

Figure 21:
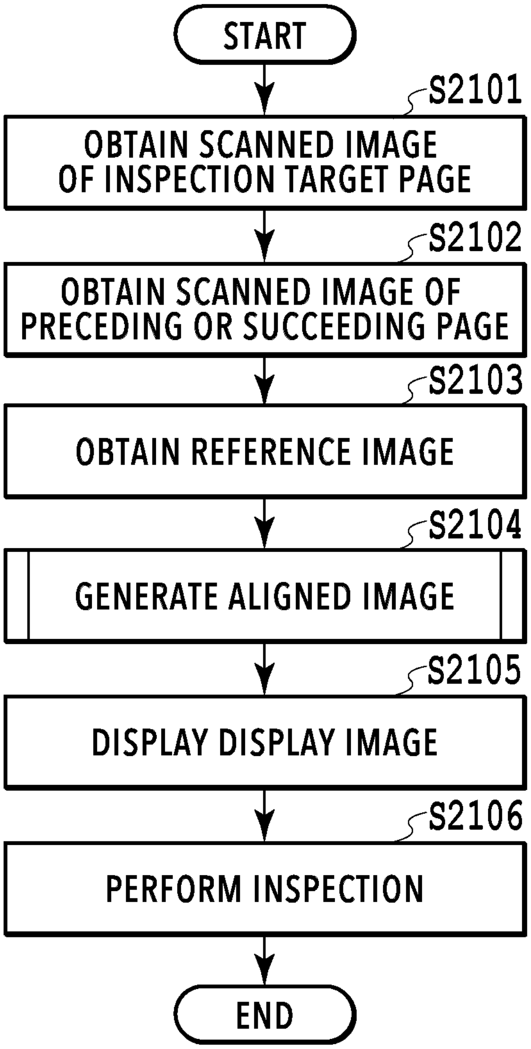
FIG. 21 is a flowchart illustrating the process of image processing of the fourth embodiment.

FIG. 21 is a flowchart illustrating the process of image processing executed by the CPU 101 in the fourth embodiment. In FIG. 21, steps other than S2105 have the same contents as in the image processing illustrated in FIG. 3 in the first embodiment. Specifically, S2101 to S2104 are the same as S301 to S304 in FIG. 3, and S2106 is the same as S305 in FIG. 3. The following description will be made of processing at S2105, which is processing different from in the first embodiment.

At S2105, the CPU 101 (display control unit 2001) generates a display image including the vicinity region of the reference position marker based on the scanned image of the preceding or succeeding page, and outputs the generated display image to the printing apparatus 190 or displays the generated display image on the UI panel 108.

In the present embodiment, one reference position marker is printed at start of each page. In the aligned image generation processing at S2104, the pixel positions $P_{407}$ $(x_{407}, y_{407})$ and $P_{410}$ $(x_{410}, y_{410})$ of the reference position marker 407 on the scanned image 406 of the inspection target page and the reference position marker 410 on the scanned image 409 of the succeeding page are detected as illustrated in FIGS. 9A and 9B.

In this case, the CPU 101 clips an image (marker vicinity image 2201) of the vicinity of the representative position $P_{410}$ $(x_{410}, y_{410})$ of the reference position marker 410 on the succeeding page and displays the clipped image together with an inspection result image.

Figure 22A:
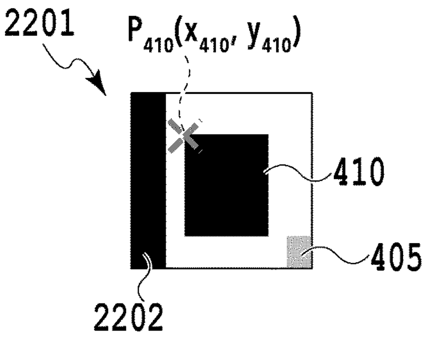
FIGS. 22A to 22E are diagrams illustrating exemplary display image data.

FIG. 22A is an exemplary image (marker vicinity image 2201) of the vicinity of the detected position $P_{410}$ $(x_{410}, y_{410})$ of the reference position marker 410 on the succeeding page. The marker vicinity image 2201 is an image obtained by clipping the vicinity region of the representative position $P_{410}$ $(x_{410}, y_{410})$ of the reference position marker 410 from the scanned image of the succeeding page. The vicinity is a region including at least a pixel at the representative position $P_{410}$ $(x_{410}, y_{410})$ and including part or the entire of the reference position marker 410. The marker vicinity image 2201 preferably includes a sheet end part 2202, part of the print image 405 of the succeeding page, or the like, so that the positional relation with an image of the surroundings of the reference position marker 410 can be understood.

Figure 22B:
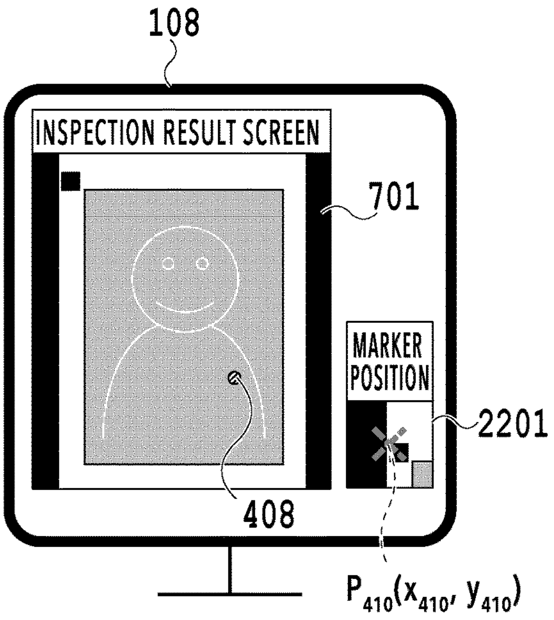

FIG. 22B is a diagram illustrating exemplary display of the marker vicinity image 2201 on the UI panel 108. As illustrated in FIG. 22B, a display image of the marker vicinity image 2201 is output to the UI panel 108 and displayed alongside the inspection result image 701. Note that the exemplary display of the marker vicinity image 2201, disposition of the inspection result image 701 and the marker vicinity image 2201, and the like, are examples and the present invention is not limited to the examples.

With the image processing described above, the user can easily visually recognize the detected position of the reference position marker on the preceding or succeeding page in a case when a defect is detected at inspection, and accordingly can check existence of positional shift due to error in the detected position of the marker.

Note that the CPU 101 may display the representative position of the reference position marker in an emphasized manner in the marker vicinity image 2201 so that the user can more easily visually recognize the position of the reference position marker. For example, in the example of FIG. 22B, a cross mark is illustrated at the detected position $P_{410}$ of the reference position marker 410 in the marker vicinity image 2201 for emphasized display. Moreover, the CPU 101 may display the marker vicinity image 2201 in a zoomed-in or zoomed-out manner so that the user can easily visually recognize the position of the reference position marker on the preceding or succeeding page.

Figure 22C:
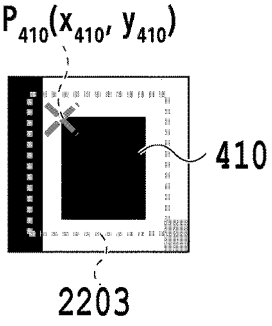

Moreover, a detection setting region of the reference position marker 410 may be displayed in an emphasized manner with a rectangle 2203 or the like as illustrated in FIG. 22C. The detection setting region is an image region in which the CPU 101 applies detection processing for detecting the reference position marker on the scanned image. A region in which the reference position marker is positioned in the scanned image and that is determined with sheet conveyance shift, and the like, taken into account is set as the detection setting region in advance.

Figure 22D:
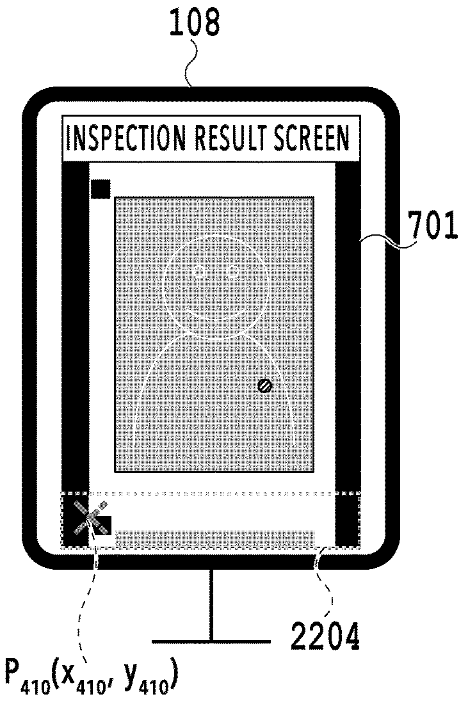

As illustrated in FIG. 22D, a synthesized image obtained by coupling a marker vicinity image 2204 of the succeeding page (or the preceding page) below (or above) the inspection result defect image data 701 may be displayed. In this case, a cross mark may be displayed at the detected position of the reference position marker $P_{410}$.

Figure 22E:
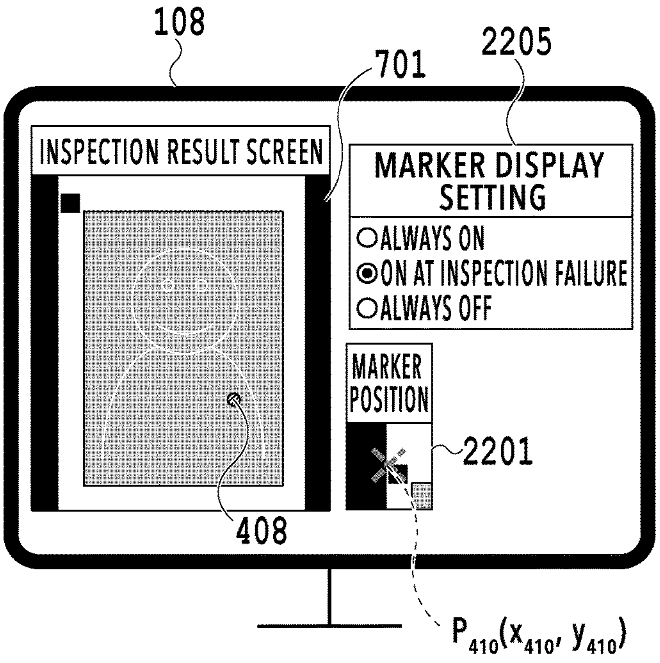

As illustrated in FIG. 22E, a display setting operation unit 2205 may be displayed in a screen where the inspection result image 701 and the marker vicinity image 2201 are displayed so that display and non-display of the marker vicinity image 2201 can be switched by a user operation.

The display setting operation unit 2205 is an operation unit through which setting of display and non-display of the marker vicinity image 2201 is input. For example, such an operation is received that switches "always ON" for constantly displaying the marker vicinity image 2201, "ON at inspection failure" for displaying the marker vicinity image 2201 only in a case when a defect is found in the inspection processing, "always OFF" for not constantly displaying the marker vicinity image 2201, and the like. Note that the display setting operation unit 2205 is not limited to the example of FIG. 22E but may be displayed also in a case of the detection setting region illustrated in FIG. 22C is displayed or in a case of the coupled display illustrated in FIG. 22D is performed.

As described above, according to the fourth embodiment, in a case when a defect is detected in the inspection processing, an image of the vicinity of the reference position marker on the preceding or succeeding page is displayed together with an image illustrating an inspection result. Thus, the user can visually check whether the defect detected in the inspection processing is detected due to positional shift caused by error in the detected position of the marker, and accordingly, usability improves.

Modification of Fourth Embodiment

A modification of the fourth embodiment will be described below with reference to FIGS. 23 and 24.

In the fourth embodiment, a description is made of the method of displaying the detected position of the reference position marker on the preceding or succeeding page so that the user can easily visually recognize the detected position in a case when a defect is detected in the inspection processing. However, in a case when the reference position marker on the preceding page of the start page or the succeeding page of the end page is estimated at S603 described above (in the first embodiment), for example, only a mark of an estimated position is illustrated on a white blank of the roll sheet even if an image of the vicinity of the estimated position is displayed as the marker vicinity image 2201. Thus, it is difficult for the user to check the accuracy of estimating the estimated position.

In Modification 2, a description will be made of a method of displaying image data of the vicinity region of the reference position marker on the start page or the end page in superimposition so that the user can easily visually recognize the accuracy of estimating an estimated position of the reference position marker on the preceding page of the start page or the succeeding page of the end page.

(Operation of Display Control Unit 2001)

Figure 23:
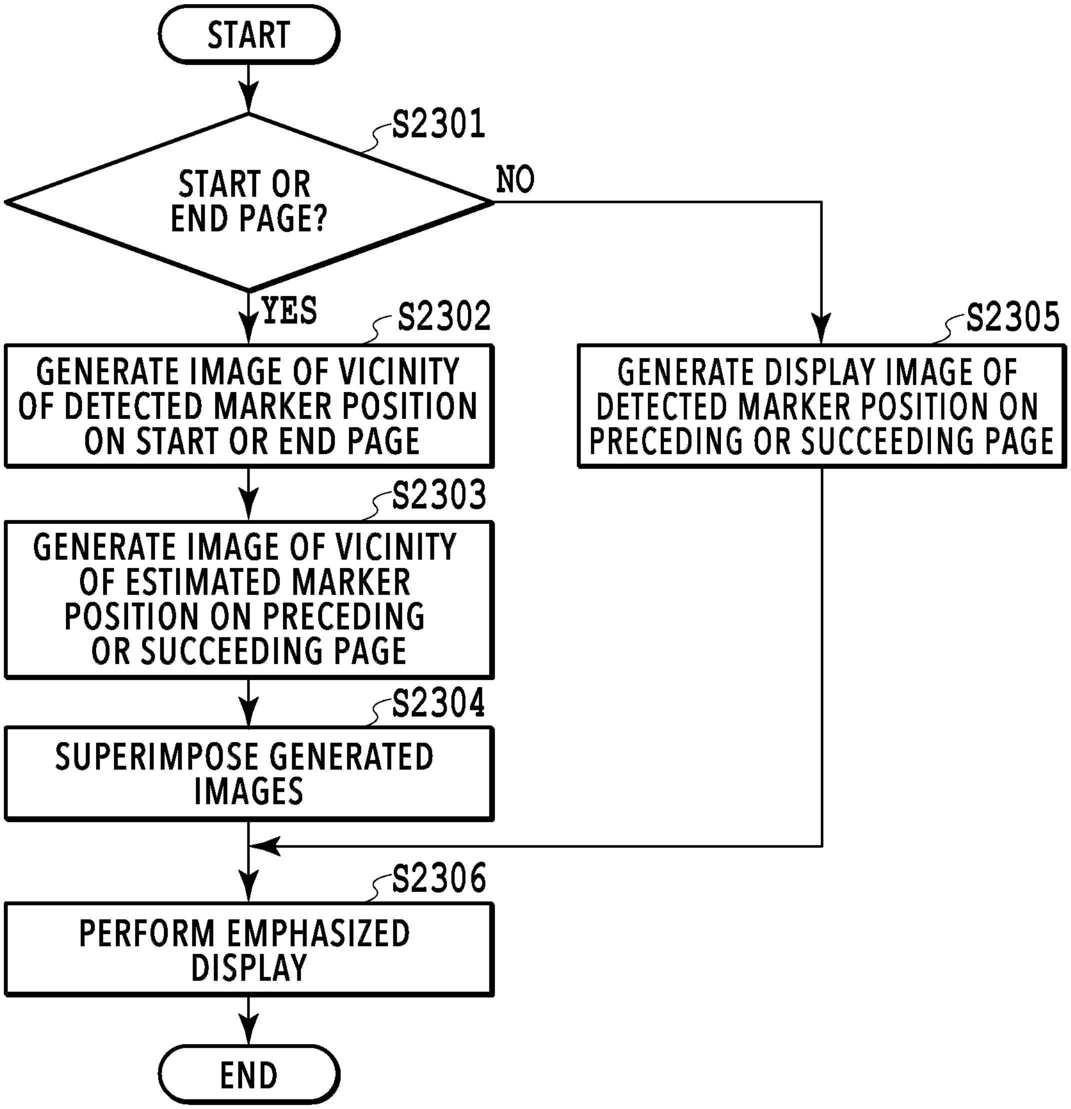
FIG. 23 is a flowchart illustrating the process of display processing of Modification 2.

FIG. 23 is a flowchart illustrating the process of display processing executed by the display control unit 2001 of the image processing apparatus 100. The present flowchart is processing executed at S2105 in the flowchart in FIG. 21.

At S2301, the CPU 101 determines whether the inspection target page is the start or end page. In a case when the inspection target page is the start or end page (YES at S2301), the CPU 101 proceeds to S2302. In a case when the inspection target page is not the start nor end page (NO at S2301), the CPU 101 proceeds to S2305. For example, in a case when the reference position marker is printed at start of each page, whether the inspection target page is the end page is determined at S2301. In a case when the reference position marker is printed at end of each page, whether the inspection target page is the start page is determined at S2301.

Figure 24A:
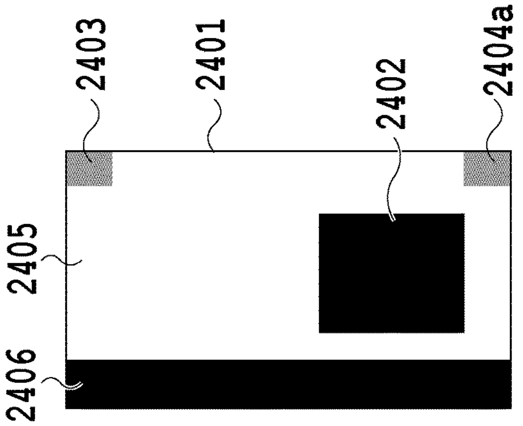
FIGS. 24A to 24F are diagrams illustrating exemplary display image data of Modification 2.

At S2302, the CPU 101 generates a display image of the detected position of the reference position marker on the start or end page. In a case when one reference position marker is printed at start of each page, a marker vicinity image 2401 including the vicinity region of the detected position of a reference position marker 2402 on the end page (N-th page) is generated as illustrated in FIG. 24A. The marker vicinity image 2401 includes the reference position marker 2402 included in a scanned image of the end page (N-th page), a part 2404*a* (upper-left corner part) of a print image of the end page (N-th page), a white blank region 2405, and a sheet outside region 2406.

The marker vicinity image 2401 is clipped to include a part 2403 of a print image included in a scanned image of the preceding page ((N−1)-th page) of the end page (N-th page) so that the user can easily visually recognize the accuracy of estimating the position of a reference position marker estimated after the end page.

Figure 24B:
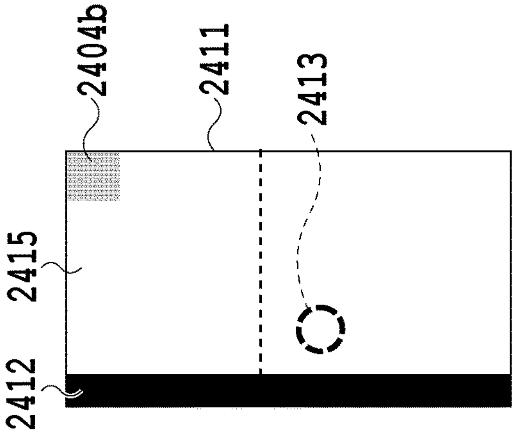

At S2303, the CPU 101 generates a display image of the estimated position of the reference position marker on the preceding page of the start page or the succeeding page of the end page. In the present embodiment, since one reference position marker is printed at start of each page, an image 2411 of the vicinity of an estimated position 2413 of the reference position marker on the succeeding page ((N+1)-th page) of the end page (N-th page) is generated as the display image as illustrated in FIG. 24B. The image 2411 includes a part 2404*b* (lower-left corner part) of the print image of the end page (N-th page), a white blank region 2415, and a sheet outside region 2412.

The white blank region 2415 and the sheet outside region 2412 are scanned images of the succeeding page ((N+1)-th page) on which nothing is printed. The estimated position 2413 of the reference position marker on the succeeding page ((N+1)-th page) is not scanned in reality, and, accordingly, the image 2411 includes nothing corresponding to a marker. The generated image 2411 is clipped to include the part 2404*b* (lower-left corner part) of the print image of the end page (N-th page) so that the user can easily visually recognize the accuracy of the estimated position of the reference position marker.

Figure 24C:
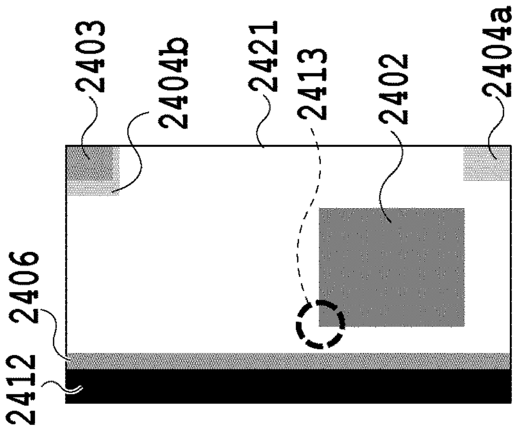

At S2304, the CPU 101 superimposes the image 2401 of the vicinity of the detected position of the reference position marker on the start or end page, which is generated at S2302, and the image 2411 of the vicinity of the estimated position of the reference position marker on the preceding or succeeding page, which is generated at S2303. In the present embodiment, a superimposed image 2421 in which the marker vicinity image 2401 of the vicinity of the detected position of the reference position marker 2402 on the end page and the image 2411 of the vicinity of the estimated position of the reference position marker on the succeeding page of the end page are superimposed on each other is generated as illustrated in FIG. 24C.

The user can infer the accuracy of the estimated position of the reference position marker by visually recognizing a positional shift between the print image 2403 of the preceding page of the end page and the print image 2404*b* of the end page, which are included in the superimposed image 2421. Specifically, in a case when there is a positional shift between the print image 2403 of the preceding page of the end page and the print image 2404*b* of the end page, it can be inferred that there is some shift in the estimated position of the reference position marker. It can be inferred that the estimated position of the reference position marker on the succeeding page is more accurately estimated as the positional shift is smaller.

Figure 24D:
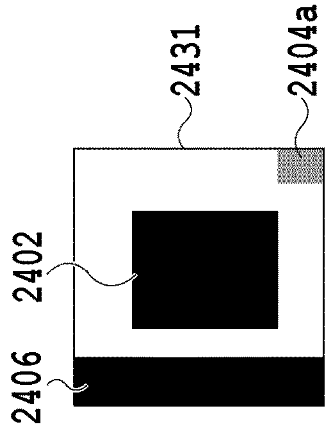

At S2305, the CPU 101 generates an image (marker vicinity image) of the vicinity of the detected position of the reference position marker on the preceding or succeeding page. For example, in a case when one reference position marker is printed at start of each page, a marker vicinity image 2431 of the vicinity of the detected position of the reference position marker on the succeeding page is generated as illustrated in FIG. 24D.

At S2306, the CPU 101 performs emphasized display processing on the marker vicinity image 2431 generated at S2305 or the superimposed image 2421 generated at S2304. For example, the CPU 101 performs the emphasized display processing of illustrating a mark at the detected position (representative position) or estimated position of the reference position marker.

Figure 24E:
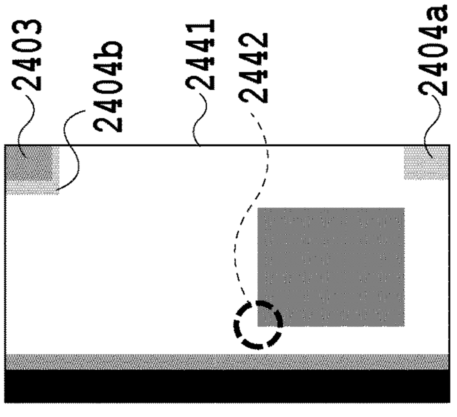
Figure 24F:
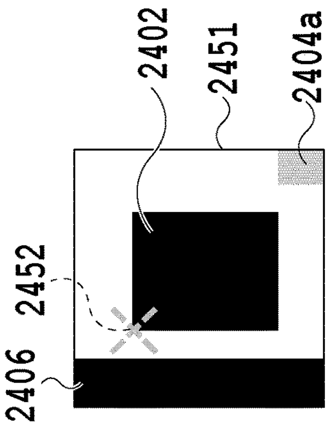

In a case of performing the emphasized display processing on the superimposed image 2421, the CPU 101 generates an emphasized display image 2441 as illustrated in, for example, FIG. 24E. A mark 2442 representing the estimated position of the reference position marker is illustrated on the emphasized display image 2441. Similarly, in a case of performing the emphasized display processing on the generated marker vicinity image 2431 at S2305, the CPU 101 generates an emphasized display image 2451 as illustrated in, for example, FIG. 24F. A mark 2452 representing the detected position of the reference position marker 2402 is illustrated on the emphasized display image 2451. Note that the shape of each mark used for emphasized display is an example and the present invention is not limited to the example.

As described above, in a case of displaying the estimated position of the reference position marker on the preceding page of the start page or the succeeding page of the end page, the CPU 101 in Modification 2 displays an image of the vicinity of the marker detected position on the preceding or succeeding page in superimposition. Accordingly, the user can infer the estimation accuracy.

Fifth Embodiment

In each above-described embodiment, the position of the reference position marker on the preceding page of the start page or the succeeding page of the end page is estimated based on the document data and printing job information of the printed material and scanning timing. However, in a case when the length of the end page in the conveyance direction of the roll sheet is longer than a predetermined threshold value, the desynchronization between the speed of scanning the printed material with the scanner 105 and the speed of roll sheet conveyance by the printing apparatus 190 accumulates and the estimation accuracy potentially decreases.

Thus, in a fifth embodiment, reference position markers are printed at start and end of the start page or the end page, and a scanned image of the start page or the end page is aligned with the reference position by using the two reference position markers.

(Operation of Image Processing Apparatus 100)

Figure 25:
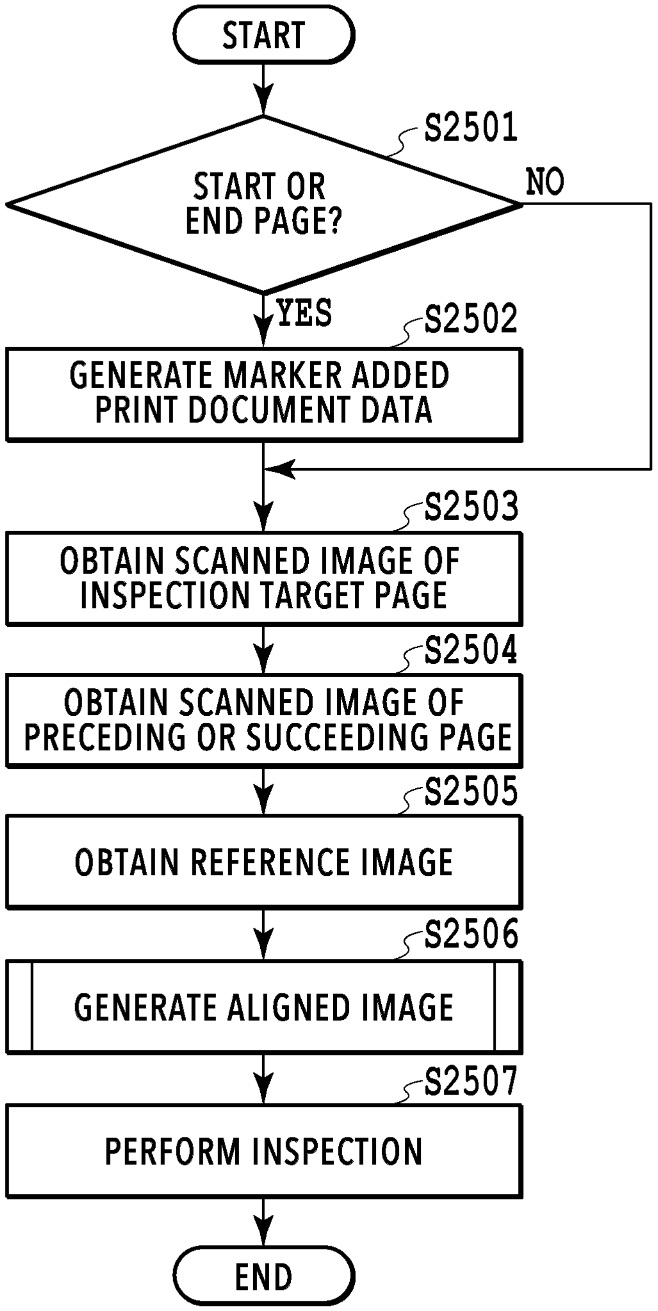
FIG. 25 is a flowchart illustrating the process of image processing of a fifth embodiment.

FIG. 25 is a flowchart illustrating the process of image processing executed by the CPU 101 in the fifth embodiment. In FIG. 25, steps except for S2501 and S2502 are the same as in the image processing (FIG. 3) in the first embodiment. Specifically, S2503 to S2507 are the same processing as S301 to S305 in FIG. 3. The image processing in the present embodiment will be described below mainly on difference from the image processing of the first embodiment.

In the present embodiment, one reference position marker is printed at start of each page.

At S2501, the CPU 101 determines whether the inspection target page is the start or end page. In the present embodiment, since one reference position marker is printed at start of each page, whether the inspection target page is the end page is determined at S2501. In a case when the inspection target page is the end page (YES at S2501), the CPU 101 proceeds to S2502. In a case when the inspection target page is not the end page (NO at S2501), the CPU 101 skips S2502 and proceeds to S2503.

Note that, in a case when one reference position marker is printed at end of each page, whether the inspection target page is the start page is determined at S2501 and the CPU 101 proceeds to S2502 in a case when the inspection target page is the start page. Otherwise, the CPU 101 proceeds to S2503.

Figure 26B:
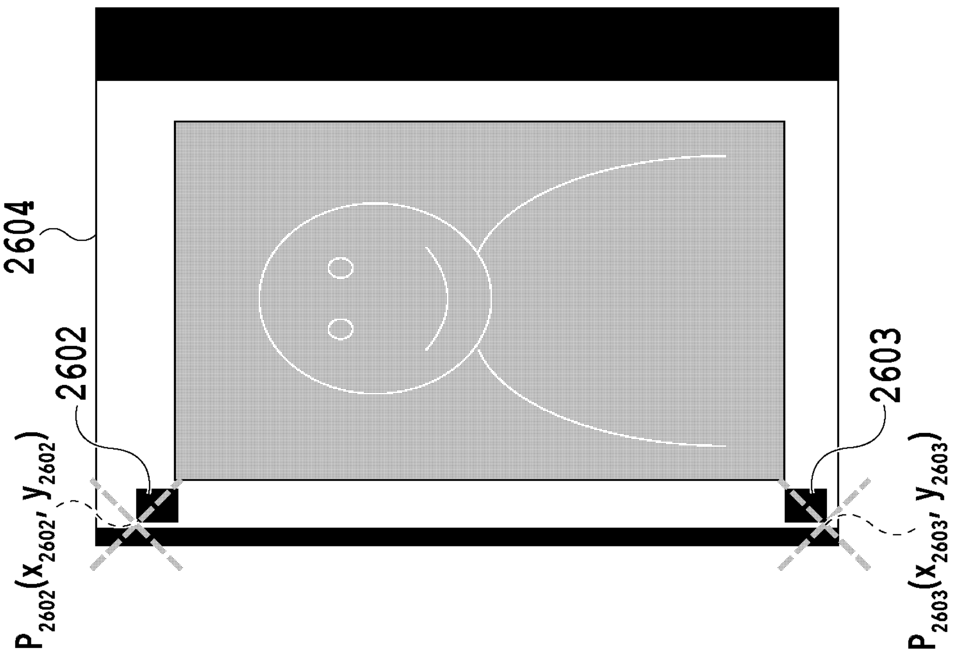
FIGS. 26A and 26B are diagrams illustrating an exemplary printing document and scanned image data of the fifth embodiment.
Figure 26A:
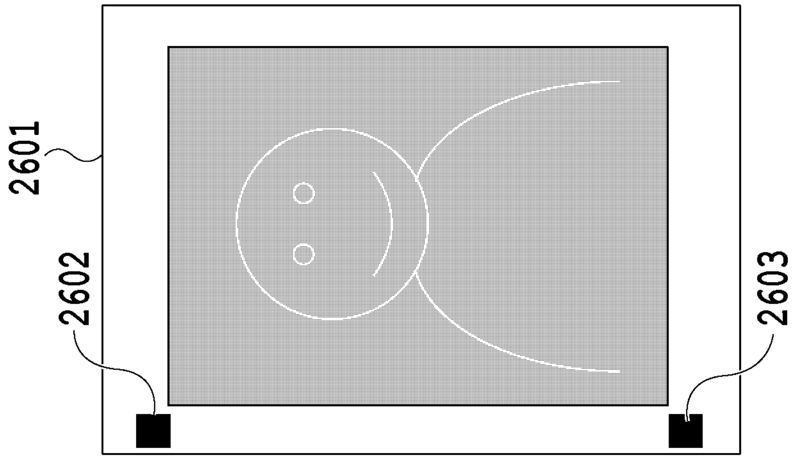

At S2502, the CPU 101 generates print document data in which reference position markers are added at start and end of the end page as the inspection target page. FIG. 26A is a diagram illustrating printing document data 2601 of the end page. As illustrated in FIG. 26A, for the printing document data 2601 of the end page, the CPU 101 generates print document data in which a reference position marker 2603 is added at end of each page in addition to a reference position marker 2602 already added at page start. The CPU 101 outputs the generated printing document data 2601 to the printing apparatus 190.

Printing is performed based on the printing document data 2601 output to the printing apparatus 190. The roll sheet subjected to the printing is sequentially conveyed to the scanner 105 and a print image on the roll sheet is read by the scanner 105. Scanned image data thus read is stored in the RAM 102 or the main storage device 104.

At S2503, similarly to S301, the CPU 101 obtains a scanned image (inspection target image) of the inspection target page, which is stored in the RAM 102 or the main storage device 104.

At S2504, similarly to S302, the CPU 101 obtains a scanned image of the preceding or succeeding page of the inspection target page, which is stored in the RAM 102 or the main storage device 104. In the present embodiment, since the reference position marker is printed at start of each page, the scanned image (the succeeding image) of the succeeding page is obtained.

At S2505, similarly to S303, the CPU 101 obtains the reference image stored in the RAM 102 or the main storage device 104.

At S2506, similarly to S304, the CPU 101 detects the reference position markers on the inspection target image and the succeeding image and generates an image (aligned image) by aligning the inspection target image with the reference positions of the above-described reference image based on positions thus detected. The processing of generating the aligned image of the end page at S2506 will be described later.

At S2507, similarly to S305, the CPU 101 inspects whether a defect exists on a print image of the inspection target page by pixel value comparison between the aligned image of the inspection target page and the reference image. The CPU 101 (inspecting unit 204) outputs, as an inspection result to the printing apparatus 190 or the UI panel 108, the defect image data 701 indicating the pixel region of the detected defect 408 as illustrated in, for example, FIG. 7, and then ends the processing of the present flowchart.

(Operation of Aligned Image Generating Unit 203)

Figure 27:
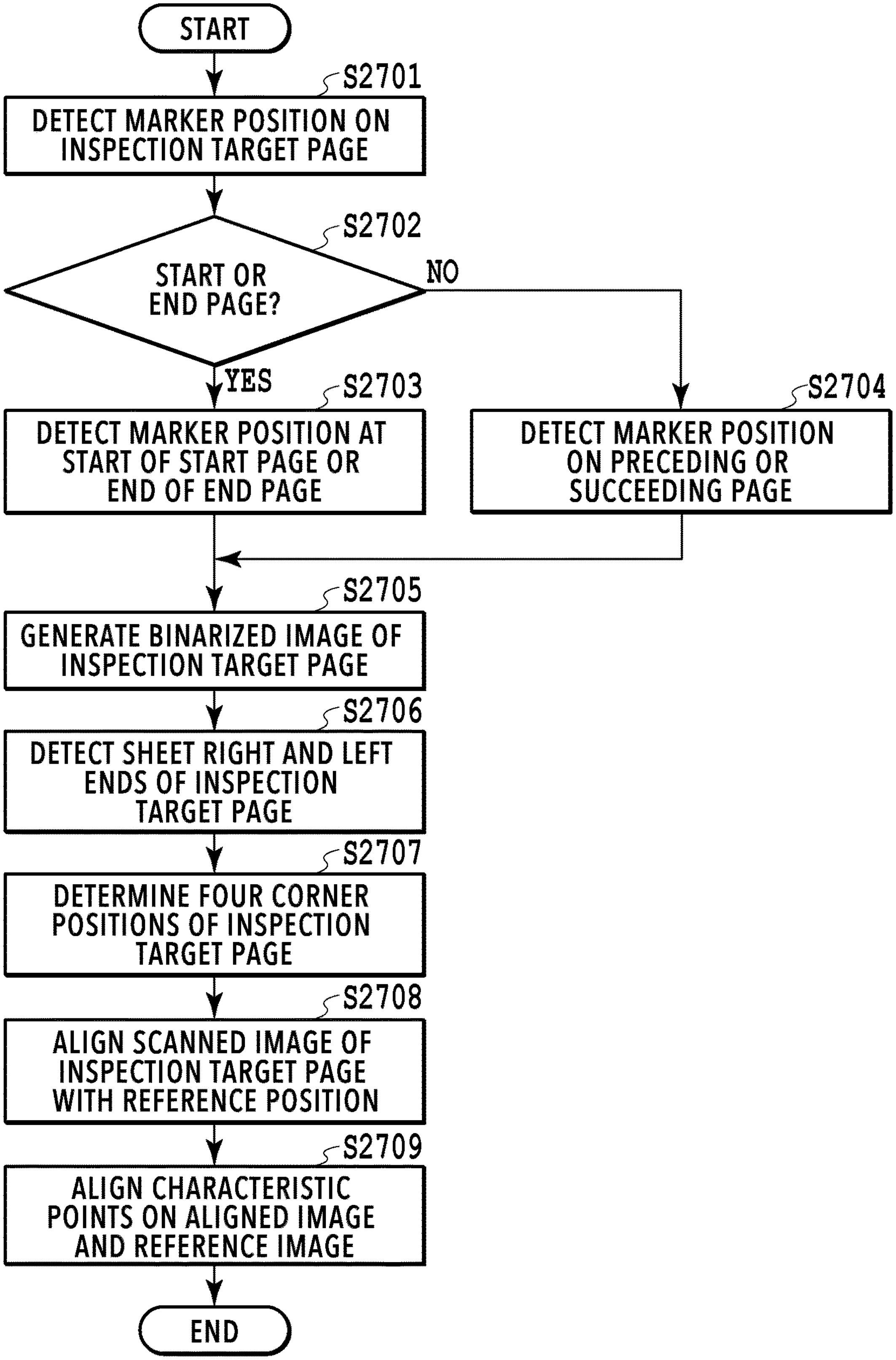
FIG. 27 is a flowchart illustrating the process of aligned image generation processing of the fifth embodiment.

FIG. 27 is a flowchart illustrating the process of the aligned image generation processing executed at S2506 described above. In FIG. 27, steps other than S2703 are the same as in the aligned image generation processing (FIG. 6) in the first embodiment. Specifically, S2701 to S2702 are the same processing as S601 to S602 in FIG. 6, and S2704 to S2709 are the same processing as S604 to S609 in FIG. 6. The image processing in the present embodiment will be described below mainly on difference from the image processing of the first embodiment.

At S2701, similarly to S601, the CPU 101 detects the representative position of the reference position marker on the scanned image (inspection target image) of the inspection target page. For example, in a case when the reference position marker is printed at page start, the CPU 101 detects, as the representative position of the reference position marker, the pixel position of the upper-left edge detected by the edge detection processing. In a case when the reference position marker is printed at page end, the CPU 101 detects the pixel position of the lower-left edge as the representative position of the reference position marker.

At S2702, the CPU 101 determines whether the inspection target page is the start or end page of printing. In the present embodiment, since the reference position marker is printed at start of each page, whether the inspection target page is the end page is determined. In a case when the inspection target page is the end page, the CPU 101 proceeds to S2703. In a case when the inspection target page is not the end page, the CPU 101 proceeds to S2704.

At S2703, the CPU 101 detects the representative position of a reference position marker (hereafter referred to as an additional marker) added at end of the end page. The detected representative position of the additional marker is stored in the predetermined storage region. In the present embodiment, the CPU 101 performs edge detection processing such as Sobel filter processing or Harris corner detection processing on a scanned image 2604 of the end page, which is illustrated in FIG. 26B. The CPU 101 detects pixels at an upper-left edge part of the reference position marker 2602 and a lower-left edge part of the additional marker 2603 on image data.

Through the processing at S2703, the pixel position of a detected pixel 2605 at the upper-left edge part of the reference position marker 2602 is detected as a representative position $P_{2602}$ ($x_{2602}$, $y_{2602}$) of the reference position marker 2602. In addition, the pixel position of a pixel 2606 at the lower-left edge part of the additional marker 2603 is detected as a position $P_{2603}$ ($x_{2603}$, $y_{2603}$) of the additional marker 2603.

At S2704, similarly to S604, the CPU 101 detects the representative position of the reference position marker on the preceding or succeeding page (in the present embodiment, the succeeding page). The detected representative position of the reference position marker is stored in the predetermined storage region (for example, the RAM 102). The pixel position of the upper-left edge part of the reference position marker on the succeeding page is detected as the representative position of the reference position marker 410.

Subsequent processing at S2705 to S2709 is the same as the processing at S605 to S609 in FIG. 6. Specifically, for a normal page, positions C1 to C4 of the four corners of the inspection target page are determined based on the positions of the reference position marker on the inspection target page and the reference position marker on the succeeding page. In a case when the inspection target page is the end page, the positions C1 to C4 of the four corners of the inspection target page are determined based on the positions of the reference position marker printed at start of the inspection target page and the additional marker added at end.

Figure 28A:
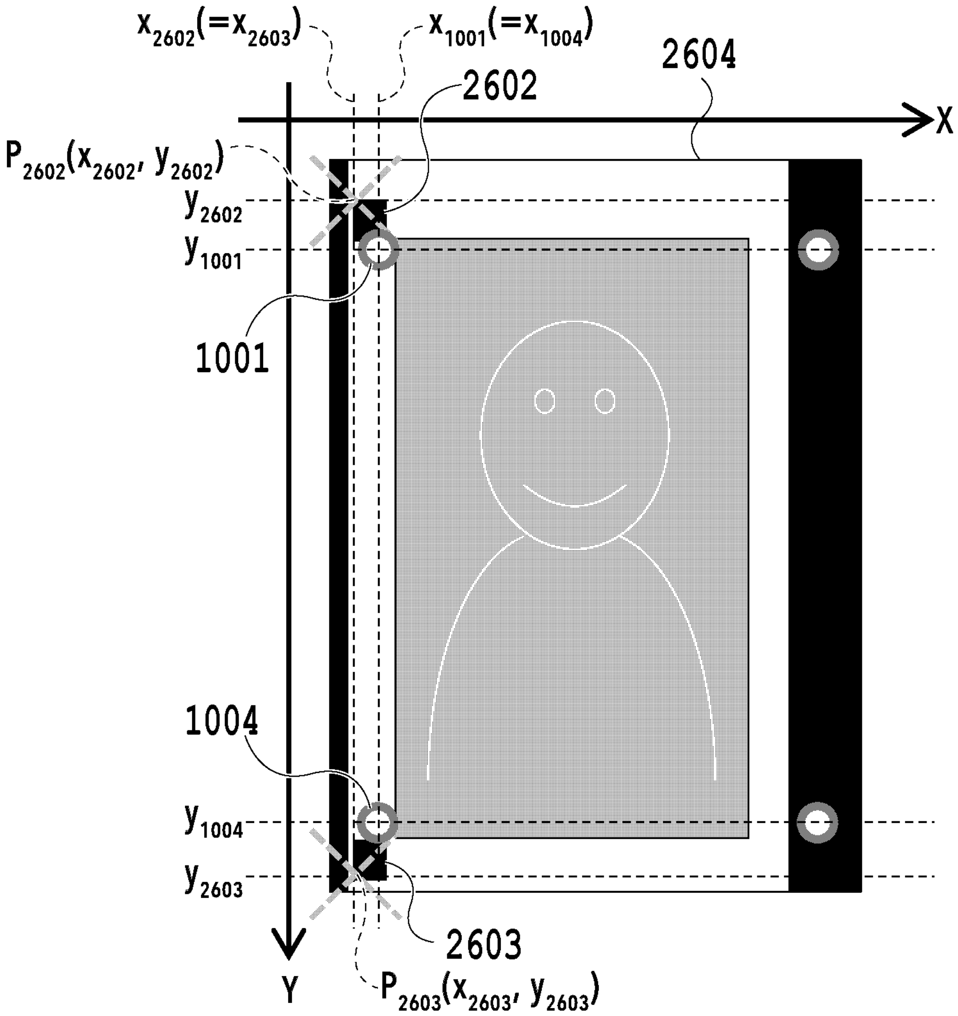
FIGS. 28A and 28B are diagrams for description of the accuracy of alignment using the reference position marker.

FIG. 28A is a diagram for description of a method of determining the positions of the four corners on the end page. As illustrated in FIG. 28A, in the scanned image 2604 of the end page, the representative position of the reference position marker 2602 at page start is $P_{2602}$ ($x_{2602}$, $y_{2602}$) and the representative position of the additional marker 2603 at page end is $P_{2603}$ ($x_{2603}$, $y_{2603}$). In the scanned image, a designed value of the pixel position of the upper-left corner 1001 of the inspection target page is ($x_{1001}$, $y_{1001}$), and a designed value of the pixel position of the lower-left corner 1004 is ($x_{1004}$, $y_{1004}$). These designed values are calculated from print document data, printing job information, and scanning timing.

Figure 28B:
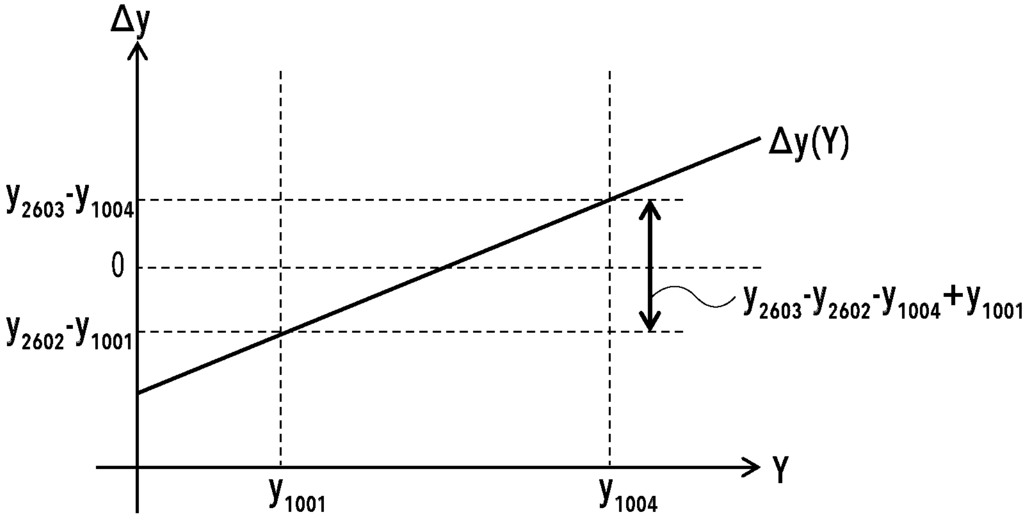

FIG. 28B is a graph illustrating change of the size of the positional shift Δy relative to a designed value in the conveyance direction (Y direction) of the roll sheet in accordance with the Y position. The horizontal axis of the graph represents the Y direction position (position in the conveyance direction of the roll sheet), and the vertical axis thereof represents the size of the positional shift Δy.

As illustrated in FIG. 28B, in a case when the scanned image data 2604 is aligned with the reference position (designed value) by using only the reference position marker at page start, the y coordinate error $\Delta y(y'_{2602})$ at a y coordinate $y'_{2602}$ of the reference position marker 2602 after the alignment is zero. However, the alignment cannot be performed with expansion and contraction in the Y direction taken into account, and thus the y coordinate error $\Delta y(y'_{2603})$ of the reference position marker 2603 at a y coordinate $y'_{2603}$ after the alignment is large at $y_{2603}-y_{2602}-y_{1004}+y_{1001}$.

In a case when the scanned image data 2604 is aligned with the reference position by using the reference position markers 2602 and 2603 at start and end of the end page, the alignment can be performed with expansion and contraction in the Y direction taken into account. Thus, the y coordinate errors at the y coordinates of the reference position markers 2602 and 2603 after the alignment are $\Delta y(y'_{2602})=\Delta y(y'_{2603})=0$.

With the image processing described above, reference position markers printed at start and end of the start page or the end page are detected and the scanned image of the start page or the end page can be highly accurately aligned with the reference position.

In the present embodiment, reference position markers printed at page start and end are detected only for the start page or the end page, but, for example, a job start or end reference position marker printed at start of the start page or end of the end page of a printing job may be used for alignment. Thus, alignment may be performed by using reference position markers with different designs among pages, and in particular, designs of reference position markers do not necessarily need to be identical among pages.

Although the embodiments of the present disclosure are described above with reference to the accompanying drawings, the present disclosure is not limited to such examples. Image processing and display processing described above in the embodiments may be combined as appropriate. Moreover, it should be understood that various modified examples or corrected examples that the skilled person in the art would thought of in the scope of the technical idea disclosed in the present application belong to the technical scope of the present disclosure.

Other Embodiments

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus configured to execute image processing based on image data obtained by reading a print image continuously printed on a printing medium, the print image being marked with one marker per inspection unit region, the image processing apparatus comprising:

an obtaining unit configured to obtain data of an inspection target image obtained by reading the print image of the one inspection unit region and data of an adjacent image obtained by reading a region that is adjacent to the print image of the one inspection unit region in a conveyance direction of the printing medium and includes the marker; and a generating unit configured to generate an aligned image by aligning the inspection target image with a reference image based on a position of the marker on the inspection target image and a position of the marker on the adjacent image.

2. The image processing apparatus according to claim 1, wherein the obtaining unit obtains data of the inspection target image and data of the adjacent image such that the inspection target image of one inspection unit region exists between the marker on the inspection target image and the marker on the adjacent image.

3. The image processing apparatus according to claim 1, wherein, in a case when part of the marker is not detected on the inspection target image or the adjacent image, the generating unit estimates the position of the marker based on a detected part of the marker, and generates the aligned image by aligning the inspection target image with the reference image based on the estimated position of the marker, the reference image being set in advance.

4. The image processing apparatus according to claim 3, wherein the marker includes a characteristic part for determining whether part of the marker is read or whether all of the marker is read.

5. The image processing apparatus according to claim 4, wherein the characteristic part exists at an end part of the marker in the conveyance direction of the printing medium.

6. The image processing apparatus according to claim 1, wherein, in a case when the marker cannot be detected on the inspection target image, the generating unit generates the aligned image based on a marker detected on the adjacent image on a front side of the inspection target image in the conveyance direction and a marker detected on the adjacent image on a back side of the inspection target image in the conveyance direction.

7. The image processing apparatus according to claim 1, wherein, in a case when the marker is normally detected on the inspection target image and the marker cannot be detected on the adjacent image, the generating unit generates the aligned image based on a marker detected on the inspection target image and a marker detected on another image adjacent to the adjacent image.

8. The image processing apparatus according to claim 1, wherein, in a case when the marker is normally detected on the inspection target image, the marker cannot be detected on the adjacent image, and another image adjacent to the adjacent image is not obtained, the generating unit estimates a position of the marker on the adjacent image based on the position of the marker detected on the inspection target image and relative distance between the markers on multiple inspection unit regions, which is determined based on document data and printing job information, and generates the aligned image based on the estimated position of the marker and the position of the marker detected on the inspection target image.

9. The image processing apparatus according to claim 1, further comprising a notifying unit configured to notify error in a case when the marker cannot be detected on the inspection target image and the adjacent image.

10. The image processing apparatus according to claim 1, wherein, in a case when the inspection target image is an inspection unit region corresponding to start or end of printing and has no adjacent image, the generating unit estimates the position of the marker on the adjacent image based on the position of the marker detected on the inspection target image and relative distance between the markers on multiple inspection unit regions, which is determined based on document data and printing job information, and generates the aligned image based on the estimated position of the marker and the position of the marker detected on the inspection target image.

11. The image processing apparatus according to claim 1, further comprising a display controlling unit configured to display an image of a vicinity region of the marker detected on the adjacent image.

12. The image processing apparatus according to claim 11, further comprising an inspecting unit configured to inspect a defect of the inspection target image by comparing the aligned image and the reference image, wherein the display controlling unit displays an image illustrating a result of the inspection by the inspecting unit and an image of a vicinity region of the marker detected on the adjacent image.

13. The image processing apparatus according to claim 11, wherein the display controlling unit displays the position of the marker detected on the adjacent image in an emphasized manner.

14. The image processing apparatus according to claim 11, wherein the display controlling unit generates and displays a synthesized image obtained by coupling the image of the vicinity region of the marker detected on the adjacent image to the aligned image.

15. The image processing apparatus according to claim 11, wherein, in a case when the inspection target image is an inspection unit region corresponding to start or end of printing and has no adjacent image, the display controlling unit displays an estimated position of the marker on the adjacent image in superimposition on an image of a vicinity region of the marker on the inspection target image.

16. The image processing apparatus according to claim 11, further comprising an operating unit configured to switch display and non-display of the image of the vicinity region of the marker detected on the adjacent image.

17. The image processing apparatus according to claim 10, further comprising a warning unit configured to warn that estimation accuracy of the position of the marker on the adjacent image decreases in a case when the length of the print image of the one inspection unit region in the conveyance direction equal to or longer than a length of a predetermined threshold value.

18. The image processing apparatus according to claim 1, further comprising a marker adding unit configured to add a marker to the inspection unit region in addition to the marker marked per inspection unit region, wherein the generating unit generates the aligned image for the inspection unit region corresponding to start or end of printing based on the position of the marker per inspection unit region and the position of the marker added by the marker adding unit.

19. An image processing method that causes a computer to execute image processing based on image data obtained by reading a print image continuously printed on a printing medium, the print image being marked with one marker per inspection unit region, the image processing method comprising:

obtaining data of an inspection target image obtained by reading the print image of the one inspection unit region and data of an adjacent image obtained by reading a region that is adjacent to the print image of the one inspection unit region in a conveyance direction of the printing medium and includes the marker; and generating an aligned image obtained by aligning the inspection target image with a reference image based on a position of the marker on the inspection target image and a position of the marker on the adjacent image.

20. A non-transitory computer readable storage medium storing a program that causes a computer to execute an image processing method that executes image processing based on image data obtained by reading a print image continuously printed on a printing medium, the print image being marked with one marker per inspection unit region, the image processing method comprising:

obtaining data of an inspection target image obtained by reading the print image of the one inspection unit region and data of an adjacent image obtained by reading a region that is adjacent to the print image of the one inspection unit region in a conveyance direction of the printing medium and includes the marker; and generating an aligned image obtained by aligning the inspection target image with a reference image based on a position of the marker on the inspection target image and a position of the marker on the adjacent image.

* * * * *